US012191728B2

(12) United States Patent
Chuang et al.

(10) Patent No.: US 12,191,728 B2
(45) Date of Patent: Jan. 7, 2025

(54) HAIRPIN WIRE MOTOR STATOR

(71) Applicant: DELTA ELECTRONICS, INC., Taoyuan (TW)

(72) Inventors: Yu-Wei Chuang, Taoyuan (TW); Yao-Hsien Shao, Taoyuan (TW); Ji Dai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 141 days.

(21) Appl. No.: 17/455,412

(22) Filed: Nov. 17, 2021

(65) Prior Publication Data
US 2022/0344994 A1    Oct. 27, 2022

(30) Foreign Application Priority Data
Apr. 23, 2021    (CN) .......................... 202110442901.6

(51) Int. Cl.
*H02K 3/28*    (2006.01)
(52) U.S. Cl.
CPC ...................................... *H02K 3/28* (2013.01)
(58) Field of Classification Search
CPC ............... H02K 3/28; H02K 3/04; H02K 3/12
See application file for complete search history.

(56) References Cited

U.S. PATENT DOCUMENTS

| 4,271,380 | A | * | 6/1981 | Bradler | ..................... | H02K 3/28 |
| | | | | | | 318/245 |
| 6,268,678 | B1 | * | 7/2001 | Asao | ......................... | H02K 1/16 |
| | | | | | | 310/201 |
| 6,969,938 | B2 | * | 11/2005 | Seguchi | ..................... | H02K 3/12 |
| | | | | | | 310/198 |
| 9,673,674 | B2 | | 6/2017 | Takahashi et al. | | |
| 9,847,686 | B2 | | 12/2017 | Tamura | | |
| 10,044,236 | B2 | * | 8/2018 | Tamura | ..................... | H02K 3/30 |

(Continued)

FOREIGN PATENT DOCUMENTS

| CN | 1253989 | C | * | 4/2009 | ............... H02K 3/28 |
| JP | 2009540781 | A | * | 11/2009 | ............... H02K 3/28 |

OTHER PUBLICATIONS

CN-1253989-C, Apr. 26, 2006, Denso Corp, Sequentially joined-segment armature and ac machine, Google Patents Machine Translation.*

(Continued)

*Primary Examiner* — Christopher M Koehler
*Assistant Examiner* — Ahmed F Seck
(74) *Attorney, Agent, or Firm* — CKC & Partners Co., LLC

(57) ABSTRACT

A hairpin stator includes an iron core, a plurality of slot-positions and a plurality of hairpin wires. The slot-positions are located in the circumferential direction of the iron core, and form a plurality of adjacent slot-position layers in the radial direction. The iron core includes polar regions, each polar region includes phases, and each phase includes phase slots. The hairpin wires are arranged in the slot-positions of the phase slots of the same phases of the polar regions, and the hairpin wires are connected to form windings. The hairpin wires include transpolar hairpin wires. A span of the transpolar hairpin wires on an insertion side of the iron core is equal to a quotient, which is obtained by dividing a total number of the phase slots by a total number of the polar regions, plus 1 or minus 1.

15 Claims, 26 Drawing Sheets

(56) References Cited

U.S. PATENT DOCUMENTS

| | | | | |
|---|---|---|---|---|
| 2009/0146523 A1* | 6/2009 | Kouda | ................... | H02K 3/12 |
| | | | | 310/195 |
| 2015/0076953 A1* | 3/2015 | Tamura | ................... | H02K 3/28 |
| | | | | 310/208 |
| 2015/0162787 A1* | 6/2015 | Sakaue | ................... | H02K 3/28 |
| | | | | 310/195 |
| 2016/0006328 A1* | 1/2016 | Wang | ................... | H02K 15/04 |
| 2018/0048203 A1* | 2/2018 | Ohguchi | ............... | H02K 3/345 |

OTHER PUBLICATIONS

JP-2009540781-A, Jul. 23, 2014, Robert Bosch Gm, Alternator for automobile, Google Patents Machine Translation.*
CN1253989C_-_Google_Patents_Translation.*
JP2009540781A_-_Google_Patents_Translation.*

\* cited by examiner

HAIRPIN WIRE MOTOR STATOR

CROSS-REFERENCE TO RELATED APPLICATION

This application claims priority to China Application Serial Number 202110442901.6, filed Apr. 23, 2021, which is herein incorporated by reference in its entirety.

BACKGROUND

Field of Invention

The present disclosure relates to a motor stator, and more particularly to a motor stator including hairpin wires.

Description of Related Art

Conventional hairpin wire motor stator often has a circuit design with multiple parallel-connected windings. One of the key issues is to balance the voltages of the parallel-connected windings to avoid circulating currents. The current wire winding method often requires a variety of hairpin-shaped wires with different sizes or spans in order to avoid circulating currents, which increases the complexity of the motor stator manufacturing. In view of such issue, motor manufacturers are actively looking for appropriate wire winding methods to reduce the circulating current generated during motor operation, and effectively control the types of hairpin wires and the production complexity required to manufacture motor stators.

SUMMARY

The present disclosure proposes a hairpin wire motor stator for overcoming or alleviating the problems of the prior art.

In one or more embodiments, a hairpin wire motor stator includes a ring-shaped stator core and a plurality of slot-positions. The ring-shaped stator core defines a rotor accommodation space at a center of the stator core, wherein the stator core includes an insertion side and an extension side allowing a plurality of hairpin wires to be inserted from the insertion side and protruded out from the extension side. The slot-positions are arranged on the stator core and surrounding the rotor accommodation space circumferentially. The slot-positions forms a plurality of radially-adjacent slot-position layers. The stator core includes a plurality of polar regions. Each polar region includes a plurality of phases. Each phase includes a plurality of phase slots. The phase slots are arranged immediately-adjacent circumferentially and includes at least a leftmost phase slot and a rightmost phase slot. Each phase slot is composed of the slot-positions that are radially-adjacent. The hairpin wires are configured to be inserted into the slot-positions of the phase slots of the same phases of the polar regions. The hairpin wires are connected to form a plurality of windings, and one of the windings has two ends inserted into the leftmost phase slot and the rightmost phase slot of the phase slots of the same phases across the polar regions. The hairpin wires include a plurality of transpolar hairpin wires that have a span at the insertion side. The span equals to a quotient, which is obtained by dividing a total number of the phase slots by a total number of the polar regions, plus or minus 1.

In one or more embodiments, a hairpin wire motor stator includes a ring-shaped stator core and a plurality of slot-positions. The stator core defines a rotor accommodation space at a center of the stator core, wherein the stator core includes an insertion side and an extension side allowing a plurality of hairpin wires to be inserted from the insertion side and protruded out from the extension side. The slot-positions are arranged on the stator core and surrounding the rotor accommodation space circumferentially. The slot-positions form a plurality of radially-adjacent slot-position layers. The stator core includes a plurality of polar regions. Each polar region includes a plurality of phases. Each phase includes a plurality of phase slots. The phase slots are arranged immediately-adjacent circumferentially and includes at least a leftmost phase slot and a rightmost phase slot. Each phase slot is composed of the slot-positions that are radially-adjacent. The hairpin wires are configured to be inserted into the slot-positions of the phase slots of the same phases of the polar regions. The hairpin wires are connected to form a plurality of windings, and each winding is routed through immediately-adjacent two of the slot-position layers at the insertion side and the extension side. Each winding is configured to be routed through the same phases of all the polar regions by a span of a pole pitch at the extension side; and routed through a first phase slot and a second phase slot of the same phases of all the polar regions at the insertion side, wherein the second phase slot is immediately-adjacent to a third phase slot that is spaced from the first phase slot by a pole pitch.

In one or more embodiments, a hairpin wire motor stator includes a ring-shaped stator core, a plurality of slot-positions and a plurality of windings. The stator core includes a first side and an opposite second side. The slot-positions are located on the stator core allowing a plurality of hairpin wires to be configured through. The slot-positions are arranged on the the stator core in a circumferential direction to form adjacent slots and a plurality of radially-adjacent slot-position layers. The stator core includes a plurality of polar regions, and each polar region includes the slot positions. Each winding is composed of the hairpin wires connected and arranged across the polar regions. All the connected hairpin wires are arranged across immediately-adjacent two of the slot-position layers, and have a span, in the circumferential direction at the first side, equal to: a pole pitch plus an adjacent slot; or a pole pitch minus an adjacent slot; or a combination of a pole pitch plus an adjacent slot and a pole pitch minus an adjacent slot.

The hairpin wire motor stator disclosed herein utilizes the above-mentioned winding method to make a single winding routed through the multiple phase slots (such as A, B or A, B, C) within adjacent slot-position layers (such as L1 to L2) in the U, V, and W phases with winding through each slot-position by the same number of times, such that all the windings are evenly arranged in each slot-position to avoid the generation of circulating current. In addition, at least one of the winding methods can also make the number of parallel-connected windings of each phase equal to the number of polar regions at most. At least one of the embodiments can reduce the wire types of the hairpin wires, and only need transpolar hairpin wires (common pitch wire) and trans-layer connection wire.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
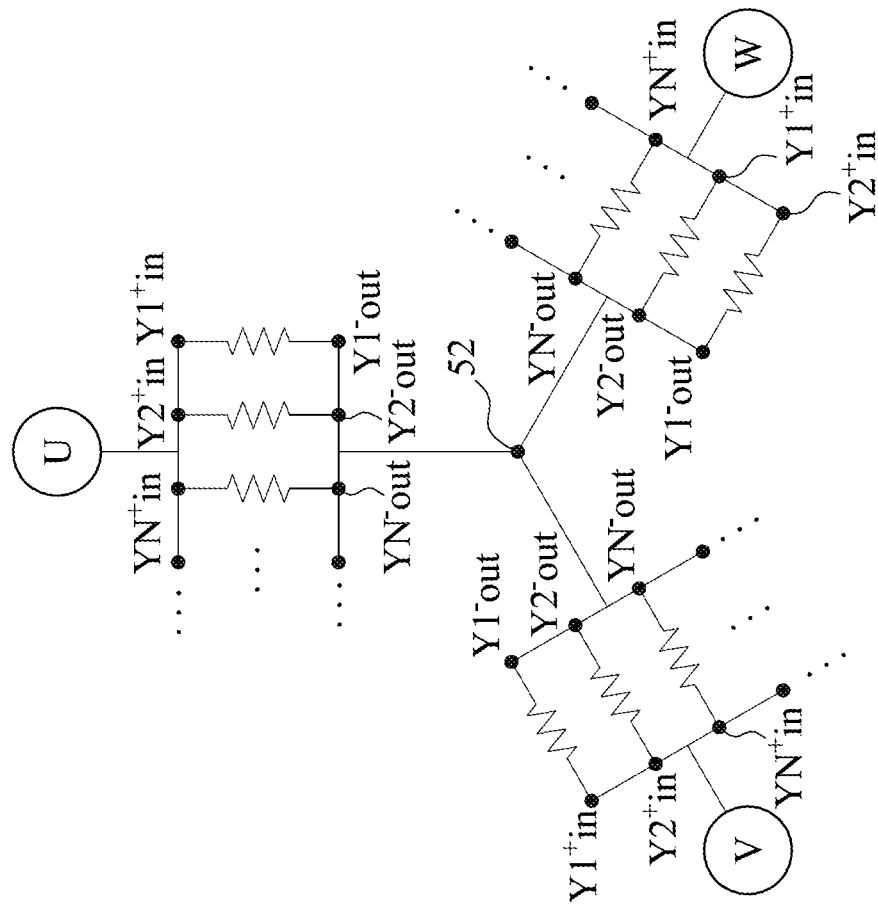
FIG. 1 illustrates a circuit diagram of a motor stator according to an embodiment of the present disclosure.

Reference will now be made in detail to the present embodiments, examples of which are illustrated in the accompanying drawings. Wherever possible, the same reference numbers are used in the drawings and the description to refer to the same or like parts. The "clockwise winding" disclosed herein is to help understand the relative position of the inserting/protruding wire, and it can also be understood as "counterclockwise winding" based on the relative position of the inserting/protruding wire. In other words, from the perspective of mechanical configuration, there is no so-called inserting/protruding wire. From the perspective of the circuit configuration, the positive [+] contact can be referred as an inserting, and the negative [−] (neutral) contact can be referred as a protruding wire.

Reference is made to FIG. 1, which illustrates a circuit diagram of a motor stator according to an embodiment of the present disclosure. Circuit 50 includes U, V, and W phase windings. Each (U, V, W) phase winding includes parallel-connected windings Y1 to YN. The negative end (YN out) of each winding YN is connected to the neutral terminal 52. In other words, each winding has YN number of ends connected to the neutral terminal(s), and the positive end (YN in) of each winding YN is connected to a corresponding phase terminal (for example, the phase terminals of the U, V, and W phases). In other words, each winding has YN number of ends connected to the phase terminals.

Figure 2:
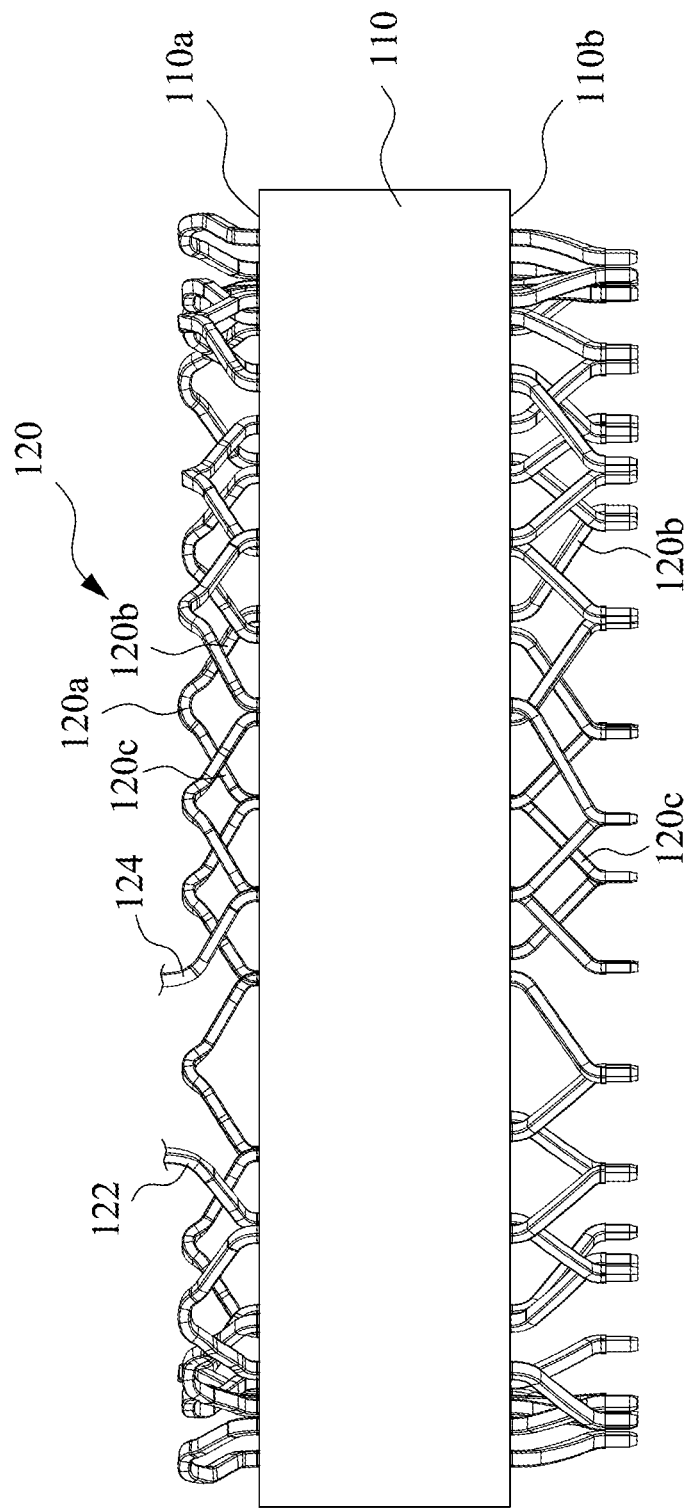
FIG. 2 illustrates a side view of a motor stator according to an embodiment of the present disclosure.

Reference is made to FIG. 2, which illustrates a side view of a motor stator 100 according to an embodiment of the present disclosure. The circuit 50 is to be implemented with a stator core 110 and a plurality of hairpin wires 120. Specifically, the legs (120b, 120c) of the plural hairpin wires 120 are inserted into corresponding (phase) slots from the insertion side 110a (also referred as first side) of the stator core 110, and protruded out from the extension side 110b (also referred as second side) of the stator core 110 and appropriately bent. After the hairpin wires 120 are installed on the stator core 110, a bent portion 120a is located at the insertion side 110a of the stator core 110, and the legs (120b, 120c) are located at the extension side 110b. When all the hairpin wires 120 belonging to the same winding are inserted into the corresponding (phase) slots, the corresponding legs (120b, 120c) can be connected (e.g., by welding), so that all the hairpin wires 120 of the same winding are connected to each other. In some embodiments of the present disclosure, the negative end and the positive end of the winding composed of the hairpin wires 120 are extended from the insertion side 110a of the stator core 110, and are respectively connected to the neutral terminal and the phase terminal. In some embodiments of the present disclosure, the negative end and the positive end of the winding composed of the hairpin wires 120 can be protruded from the insertion side 110a or the extension side 110b of the stator core 110, and are respectively connected to the neutral terminal and the phase terminal. In some embodiments of the present disclosure, all the leg ends (for example, 120b, 120c) of the hairpin wires, located in immediately-adjacent two of the slot-position layers and protruding from the extension side 110b, are connected to form a span of a pole pitch on the extension side 110b.

Figure 3:
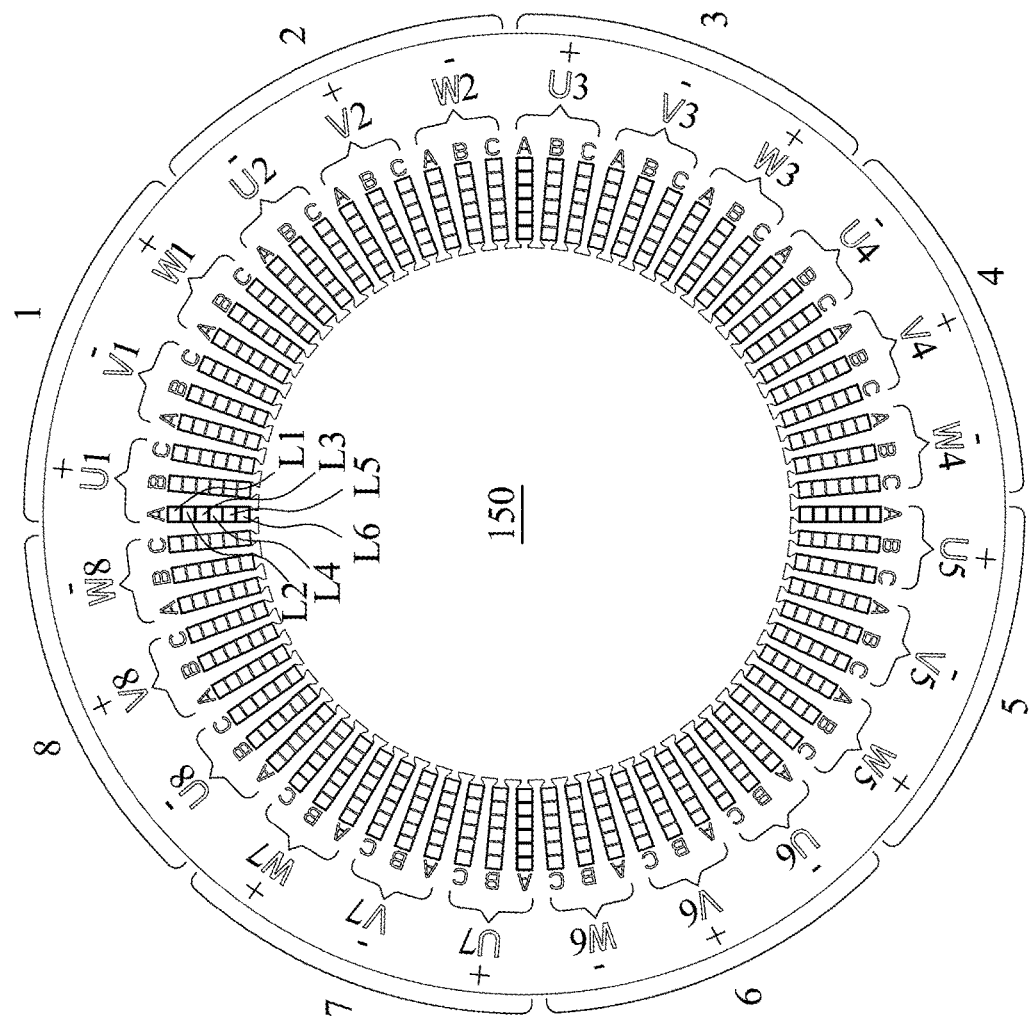
FIG. 3 illustrates a top view of a stator core of a motor stator according to an embodiment of the present disclosure.

Reference is made to FIG. 3, which illustrates a top view of a 72 slot stator core of a motor stator according to an embodiment of the present disclosure. The top view of the stator core is the top view of the insertion side of the stator core. The stator core 110 is used to realize a motor stator with 8 polar regions, 72 (phase) slots (A, B, C), and 6 slot-position layers. Each (phase) slot (A, B, C) includes a plurality of radially adjacent slot-positions (i.e., "squares" in each (phase) slot (A, B, C)), and each slot-position can accommodate one hairpin wire. All slot-positions surround the rotor accommodating space 150 in the circumferential direction, and form a plurality of slot-position layers (L1 to L6) adjacent in the radial direction. The 8 polar regions equally divide the stator core 110 in the circumferential direction, and each polar region has U, V, and W phases. For example, the first polar region has U1, V1, and W1 phases, and the second polar region has U2, V2, and W3 phases . . . . The 8th polar region has U8, V8, and W8 phases. Each phase has a plurality of Q (phase) slots, such as circumferentially adjacent phase slot A (left), phase slot B (middle), and phase slot C (right) in the circumferential direction. The quantity of phase slots for a single phase is three (i.e., Q=3). The 72 slots in this embodiment are equal to: 8 (polar region)×3 (phase/polar region)×3 (slot/phase). 72 (phase) slots and the slot-positions contained therein surround the rotor accommodating space 150 in the circumferential direction, and each (phase) slot extends from the rotor accommodating space 150 in radial direction of the stator core. Each (phase) slot allows 6 hairpin wires to be inserted into 6 slot-position layers from the outside to the inside for L1 to L6 layers. The ring-shaped stator core 110 defines a rotor accommodating space 150 for accommodating the rotor. The L6 layer is closest to the rotor accommodating space 150 as a radially-innermost one of the slot-position layers, and the L1 layer is the farthest from the rotor accommodating space 150 as a radially-outmost one of the slot-position layers. In some embodiments of the present disclosure, the (phase) slots in the polar regions have the same or nearly the same cross-sectional dimensions, and the spacing between the (phase) slots is also the same or nearly the same, but not being limited to thereto.

Figure 4:
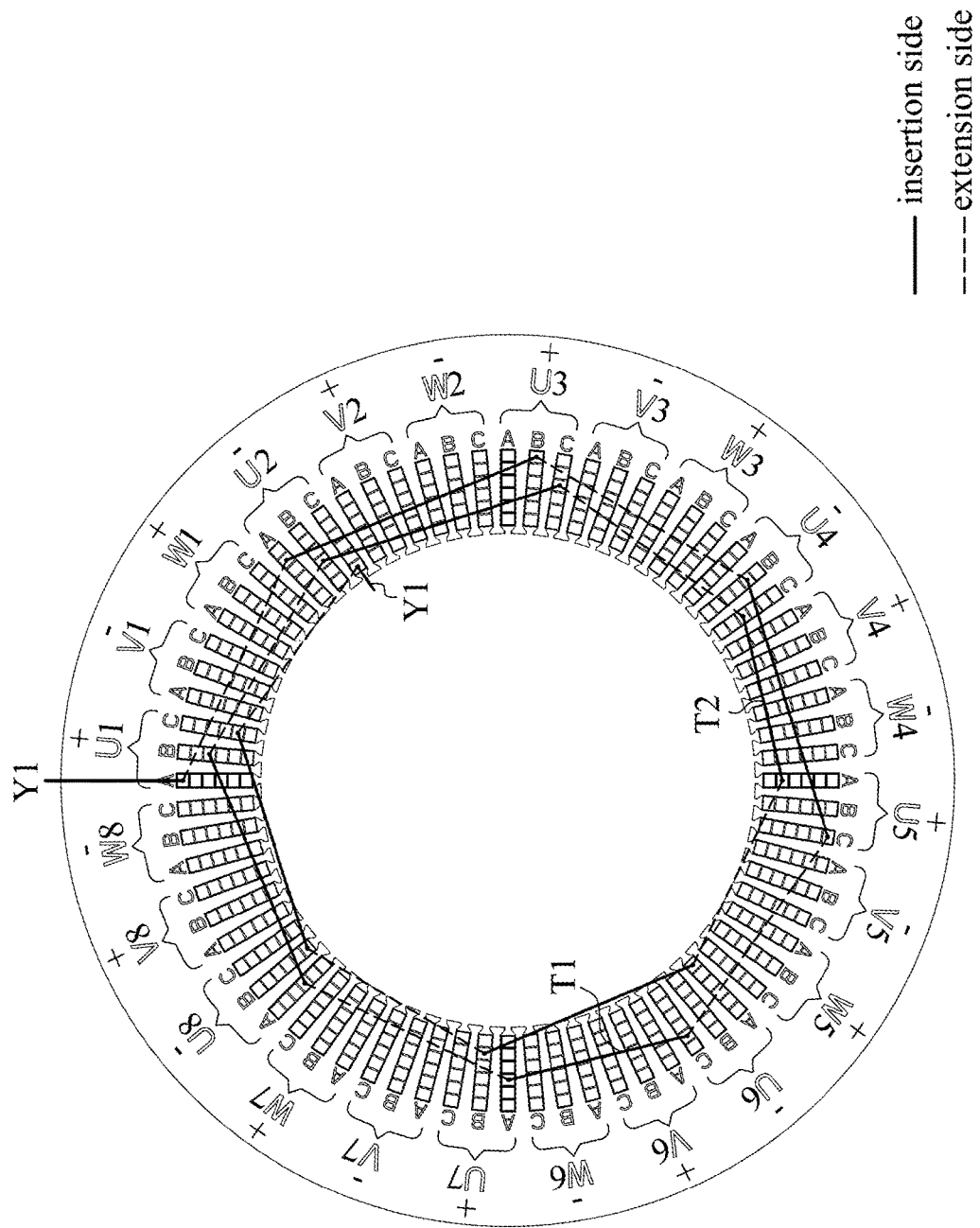
FIG. 4 illustrates one of the windings configured in U phases of a 72-slot motor stator according to an embodiment of the present disclosure.

Reference is made to FIG. 4, which illustrates one of the windings configured in U phases of a 72-slot motor stator according to an embodiment of the present disclosure. A motor stator with 8 polar regions, 72 (phase) slots, and 6 slot-position layers is realized by the stator core 110, and each of U, V, and W phases has 8 parallel-connected windings, and the number of parallel-connected windings is equal to a total number of the polar regions. Taking the U phase as an example, the wire of winding Y1 (such as the wire 122 in FIG. 2) is routed into the L1 layer of the phase slot A of the U1 phase on the insertion side of the stator core, and then connected to the L2 layer of the phase slot A of the U2 phase on the extension side of the stator core, then connected to the L1 layer of the phase slot B of the U3 phase on the insertion side of the stator core, then connected to the L2 layer of the phase slot B of the U4 phase on the extension side of the stator core, and then connected to the L1 layer of phase slot C of the U5 phase on the insertion side of the stator core, and connected to the L2 layer of the phase slot C of the U6 phase on the extension side of the stator core. At this point, the wire of winding Y1 has passed through the phase slots A, B, and C of the L1 layer once, and has also passed through the phase slots A, B, and C of the L2 layer once. Then a trans-layer connection wire T1 is used to connect the L2 layer of the phase slot C of the U6 phase to the L3 layer of the phase slot A of the U7 phase on the insertion side of the stator core, and then connected to the L4 layer of the phase slot A of the U8 phase on the extension side of the stator core, then connected to the L3 layer of phase slot B of the phase U1 on the insertion side of the stator core, then connected to the L4 layer of phase slot B of phase U2 on the extension side of the stator core, and then connected to the L3 layer the phase slot C of the U3 phase on the insertion side of the stator core, and then connected to the L4 layer of phase slot C of the U4 phase on the extension side of the stator core. The wire of winding Y1 has passed through the phase slots A, B, and C of the L3 layer once after jumping slot-position layer by the trans-layer connection wire T1, and has also passed through the phase slots A, B, and C of the L4 layer once. Then a trans-layer connection wire T2 is used to connect the L4 layer of the phase slot C of the U4 phase to the L5 layer of the phase slot A of the U5 phase on the insertion side of the stator core, and then connected to the L6 layer of the phase slot A of the U6 phase on the extension side of the stator core, then connected to the L5 layer of the phase slot B of the U7 phase on the insertion side of the stator core, then connected to the L6 layer of the phase slot B of the U8 phase on the extension side of the stator core, and then connected to the L5 layer of the phase slot C of the U1 phase on the insertion side of the stator core, then connected to the L6 layer of phase slot C of the U2 phase on the extension side of the stator core. The wire of winding Y1 has passed through the phase slots A, B, and C of the L5 layer once after jumping slot-position layer by the trans-layer connection wire T2, and also passed through the phase slots A, B, and C of the L6 layer once, and the wire of the winding Y1 at this point (the L6 layer of the phase slot C of the U2 phase) is routed out (for example, the wire 124 in FIG. 2 is out). Winding Y1 contains plural transpolar hairpin wires (for example, hairpin wires 120 in FIG. 2). These transpolar hairpin wires have a common span or the same span, and only use different types of wires at the inlet and outlet ends (for example, the hairpin wires 122, 124 in FIG. 2). The legs of the transpolar hairpin wires (for example, the legs 120b and 120c of the hairpin wires 120 in FIG. 2) are connected to each other on the extension side of the stator core (for example, the extension side 110b in FIG. 2) to form a winding. It can be seen from FIG. 4 that the wire of winding Y1 first circulates through phase slots A, B, and C in a clockwise direction on layers L1 to L2 in sequence, and then circulates through phase slots A, B and C in a clockwise direction on layers L3 to L4 in sequence, and then circulates through phase slots A, B, and C in a clockwise direction on the L5 to L6 layer in sequence. Moreover, the winding rules of the wires of winding Y1 on the L1 to L2, L3 to L4, and L5 to L6 layers are the same. In some embodiments of the present disclosure, within two adjacent slot-position layers (such as L1 to L2, L3 to L4, or L5 to L6), and the winding Y1 is routed through the same phase slot (A, B or C) of the same phases across the polar regions (e.g., U1 to U8) but through slot-positions in different slot-position layers on the extension side, and routed through the adjacent phase slots (e.g., phase slot A to phase slot B or phase slot B to phase slot C) of the same phase across the polar regions but through slot-positions in different slot-position layers on the insertion side. In some embodiments of the present disclosure, the two legs (such as the legs 120b and 120c of the hairpin wires 120 in FIG. 2) of each transpolar hairpin wires (such as the hairpin wires 120 in FIG. 2) in the winding Y1 cross two adjacent slot-position layers (such as L1 to L2, L3 to L4, or L5 to L6), and insert into slot-positions in different slot-position layers of the adjacent phase slots (phase slot A to phase slot B or phase slot B to phase slot C) of the same phases (such as U1 to U8) across the polar regions. For example, the first leg and the second leg of each transpolar hairpin wires cross the two adjacent slot-position layers, and insert into a first phase slot and a second phase slot respectively of the same phases across the polar regions where the second phase slot is immediately adjacent to a third phase slot that is spaced from the first phase slot by one pole pitch. This winding method, on the insertion side of the stator core, connects from the phase slot A to the phase slot B on adjacent Un phases (n=1 to 8), and then from the phase slot B to the phase slot C, and change slot-position layers (for example, L2 to L1, L4 to L3, or L6 to L5) when connecting phase slots. When winding on the the extension side of the stator core, it maintains the same phase slot of the same phases across the polar regions, and only crosses the two adjacent slot-position layers, such as connecting from the L1 layer to the L2 layer, from the L3 layer to the L4 layer or from the L5 layer to the L6 layer. In some embodiments of the present disclosure, when an inlet end of the winding Y1 is inserted into a leftmost one (phase slot A) of the phase slots of the same phases (U1 to U8) of the polar regions, an outlet end of the winding Y1 is inserted onto a rightmost one of the phase slots (phase slot C) of the same phases of the polar regions. In other words, on the extension side, the winding Y1 passes through the same phases of all the polar regions with a pole pitch span, and on the insertion side, the winding Y1 passes through the first phase slot and the second phase of the same phase slots of all the polar regions, where the second phase slot is immediately-adjacent to the third phase slot that is spaced from the first phase slot by one pole pitch.

Based upon using the winding rules on L1 to L2 layers, L3 to L4 layers and L5 to L6 layers, the hairpin wires used on the L1 to L2 layer, L3 to L4 layer and L5 to L6 layer have the same slot pitch across the insertion side except for the size of the trans-layer connection wire, such that a common size of hairpin wires can be used to connect. Specifically, the pole pitch or full pitch of the L1 to L2 layers, L3 to L4 layers, and L5 to L6 layers is obtained by 72 (slots) divided by 8 (polar regions), which is equal to 9 slots. A common span (or common pitch) of the transpolar hairpin wires on the insertion side is 10 (9+1) slots. In other words, the common span (such as 10) is equal to a quotient, which is obtained by dividing a total number of the (phase) slots (such as 72) by a total number of polar regions (such as 8), plus 1. In addition to the transpolar hairpin wires, a span of the trans-layer connection wires T1 and T2 on the insertion side is 7 slots, and the span of the trans-layer connection wire can be obtained from the common span 10 slots minus the quantity of the phase slots in each phase (Q=3). In some embodiments of the present disclosure, trans-layer connection wires T1 and T2 cross two adjacent slot-position layers, and two ends of the trans-layer connection wire are arranged in a leftmost phase slot and a rightmost phase of the same phases across the polar regions. In some embodiments of the present disclosure, the winding Y1 includes a plurality of (sub) windings connected to each other by the trans-layer connection wires T1 and T2, one end of one of the (sub) windings is arranged in the slot-position layer (such as L6), which is radially closest to the rotor accommodating space as a radially-innermost one of the slot-position layer, or the slot-position layer (such as L1), which is radially farthest from the rotor accommodating space as a radially-outmost one of the slot-position layers, to be connected to the phase terminals or the neutral terminals.

Figure 5:
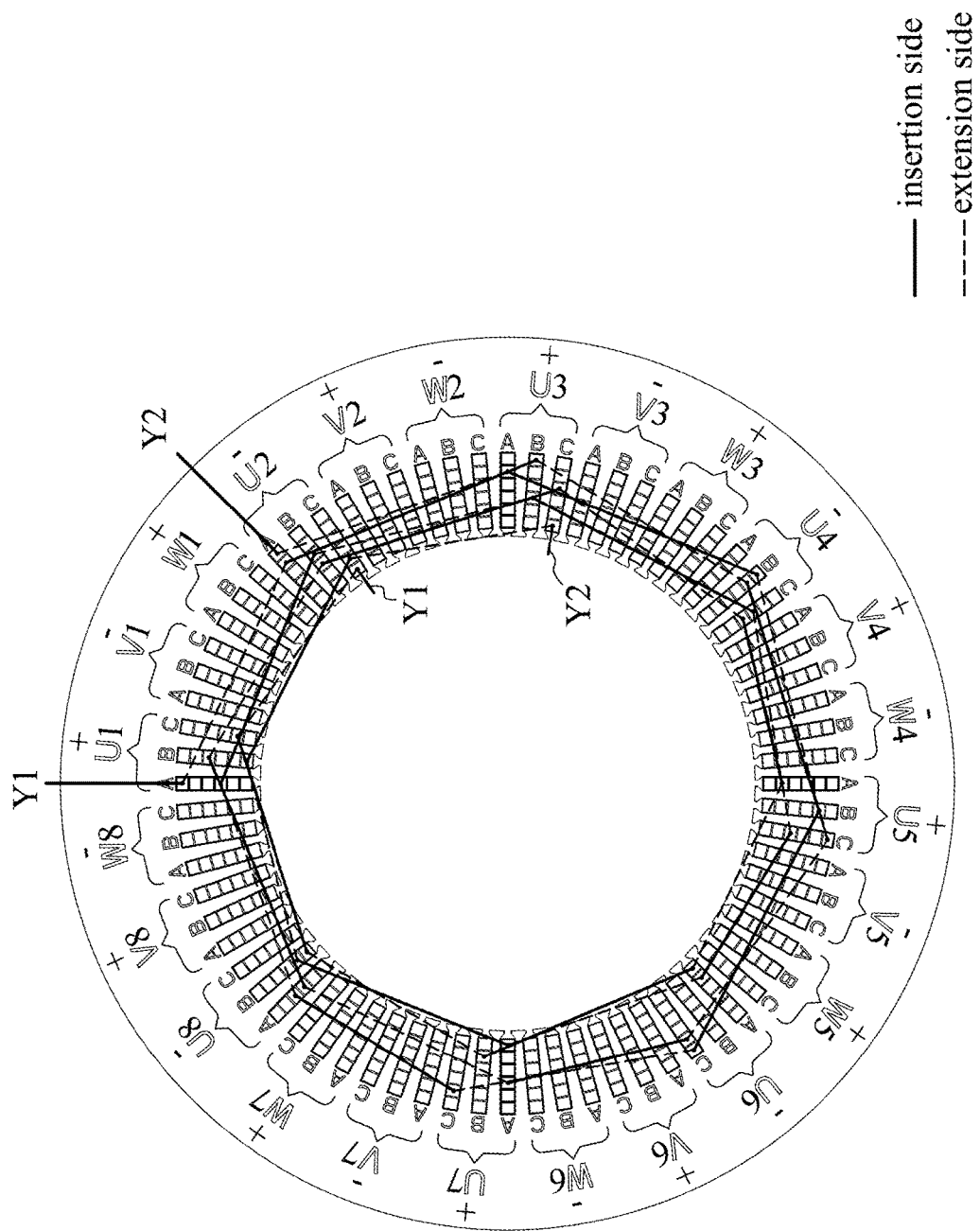
FIG. 5 illustrates two of the windings configured in U phases of a 72-slot motor stator according to an embodiment of the present disclosure.

Reference is made to FIG. 5, which illustrates two of the windings configured in U phases of a 72-slot motor stator according to an embodiment of the present disclosure. Continuing from the winding Y1 in FIG. 4, the wires of winding Y2 follow the same winding rules. After entering the L1 layer of the phase slot A of the U2 phase from the insertion side of the stator core, the wires of winding Y2 are routed through within L1 to L2 layers in a clockwise direction, alternately through the phase slots A, B, and C once. After a trans-layer connection wire, the wires of winding Y2 are then alternately routed through the phase slots A, B, and C once on the L3 to L4 layer in a clockwise direction. After another trans-layer connection wire, the wires of winding Y2 are then alternately routed through the phase slots A, B, and C once on the L5 to L6 layers in a clockwise direction, and finally routed out from the L6 layer of the phase slot C of the U3 phase.

Figure 6:
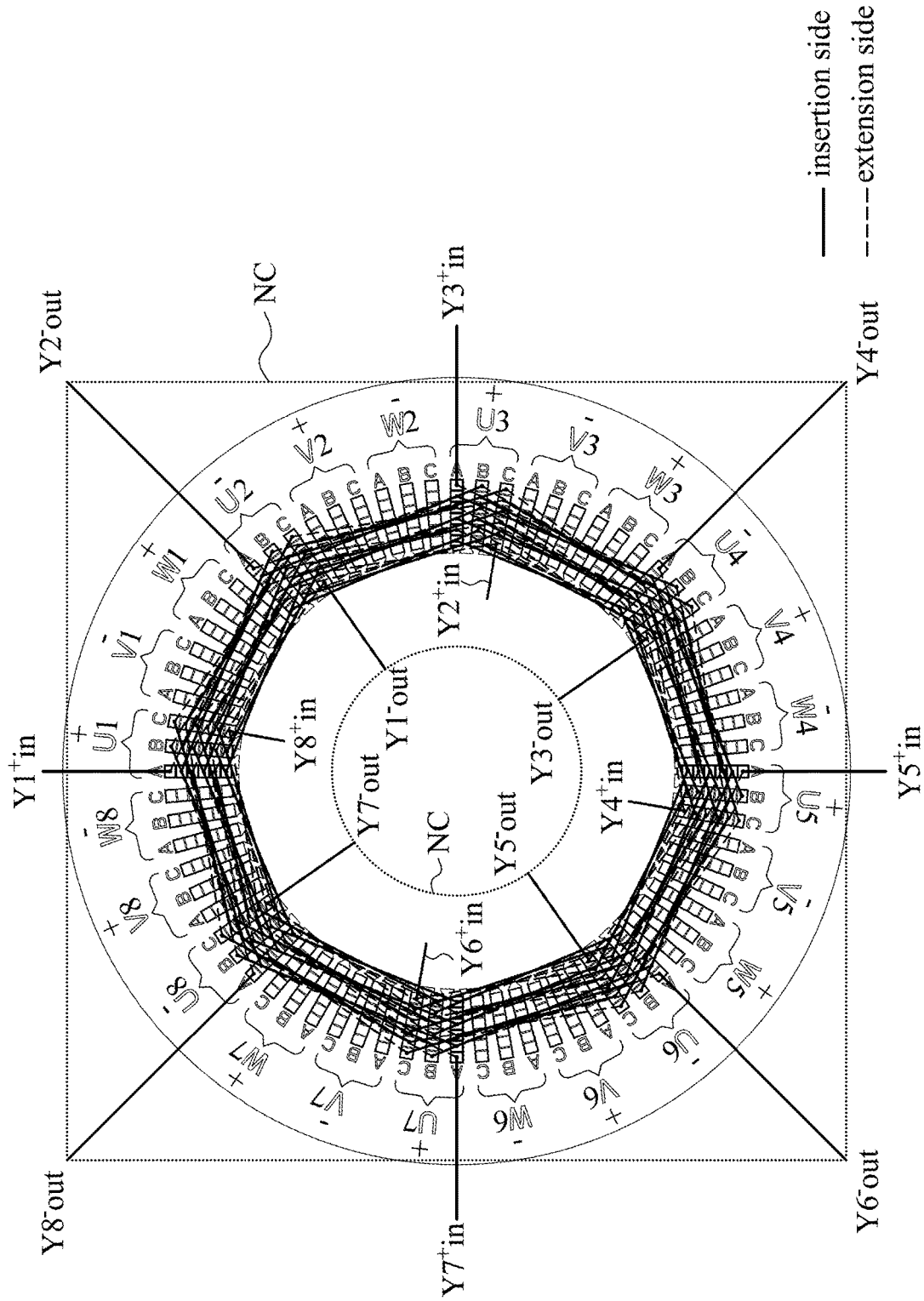
FIG. 6 illustrates 8 windings configured in U phases of a 72-slot motor stator according to an embodiment of the present disclosure.

Reference is made to FIG. 6, which illustrates 8 windings configured in U phases of a 72-slot motor stator according to an embodiment of the present disclosure. Continuing from the winding Y1 and Y2 in FIG. 5, the windings Y3 to Y8 are executed according to the same winding rules of the windings Y1 and Y2 to occupy all the U-phase slots and slot-positions. Therefore, the winding Y3 is routed into the L1 layer of the phase slot A of the U3 phase from the insertion side of the stator core, and routed out from the L6 layer of the phase slot C of the U4 phase. The winding Y4 is routed into the L1 layer of the phase slot A of the U4 phase from the insertion side of the stator core, and routed out from the L6 layer of the phase slot C of the phase U5. The winding Y5 is routed into the L1 layer of the phase slot A of the U5 phase from the insertion side of the stator core, and routed out from the L6 layer of the phase slot C of the phase U6. The winding Y6 is routed into the L1 layer of the phase slot A of the U6 phase from the insertion side of the stator core, and routed out from the L6 layer of the phase slot C of the U7 phase. The winding Y7 is routed into the L1 layer of the phase slot A of the U7 phase from the insertion side of the stator core, and routed out from the L6 layer of the phase slot C of the U8 phase. The winding Y8 is routed into from the insertion side of the stator core from the L1 layer of the phase slot A of the U8, and routed out from the L6 layer of the phase slot C of the U1 phase. The wires of the windings Y1 to Y8 occupy all phase slots and slot-positions of U1 to U8 phases. Connecting the negative end (YN−out) of Y1 to Y8 to the neutral terminal NC, and connecting the positive end (YN+in) of Y1 to Y8 to the phase terminal of the U phase to form U-phase parallel-connected windings Y1 to Y8.

Figure 7:
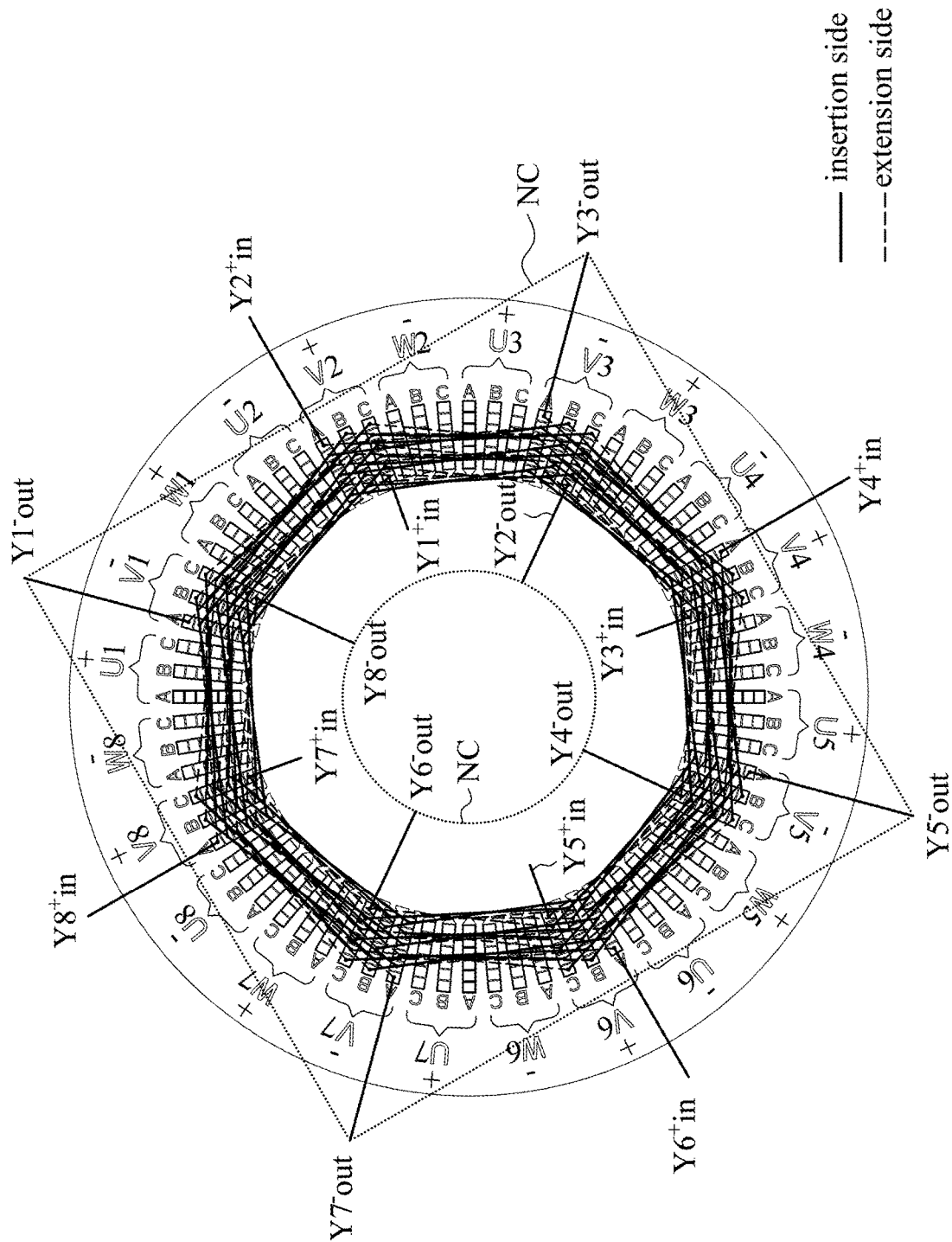
FIG. 7 illustrates 8 windings configured in V phases of a 72-slot motor stator according to an embodiment of the present disclosure.
Figure 8:
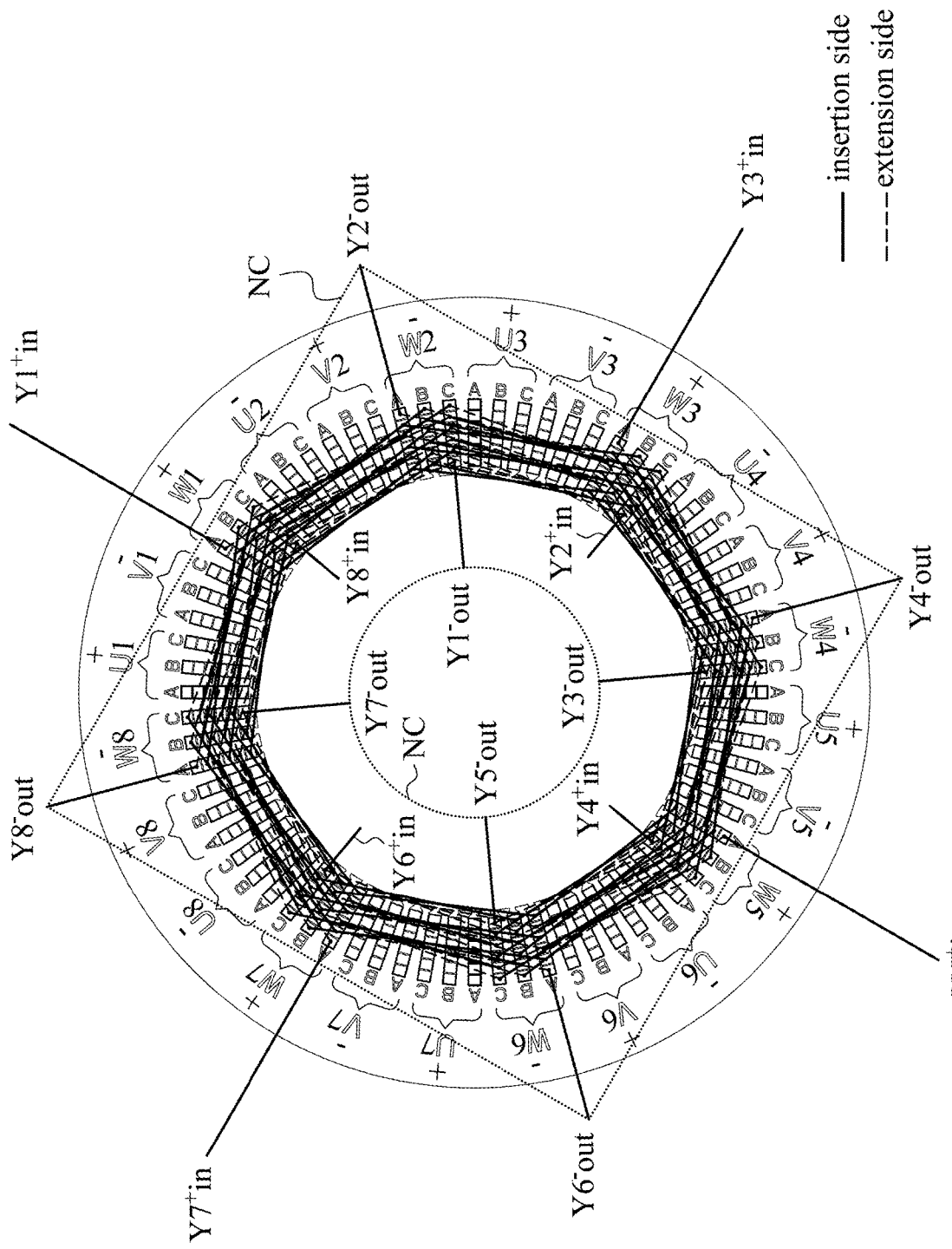
FIG. 8 illustrates 8 windings configured in W phases of a 72-slot motor stator according to an embodiment of the present disclosure.

Reference is made to FIGS. 7 and 8. Continuing from the U-phase windings in FIG. 6, 8 windings of V-phase and W-phase are also executed using the same winding principle to occupy all phase slots and slot-positions of V1 to V8 and W1 to W8, forming V-phase parallel-connected windings Y1 to Y8 and W-phase parallel-connected windings Y1 to Y8.

Figure 9:
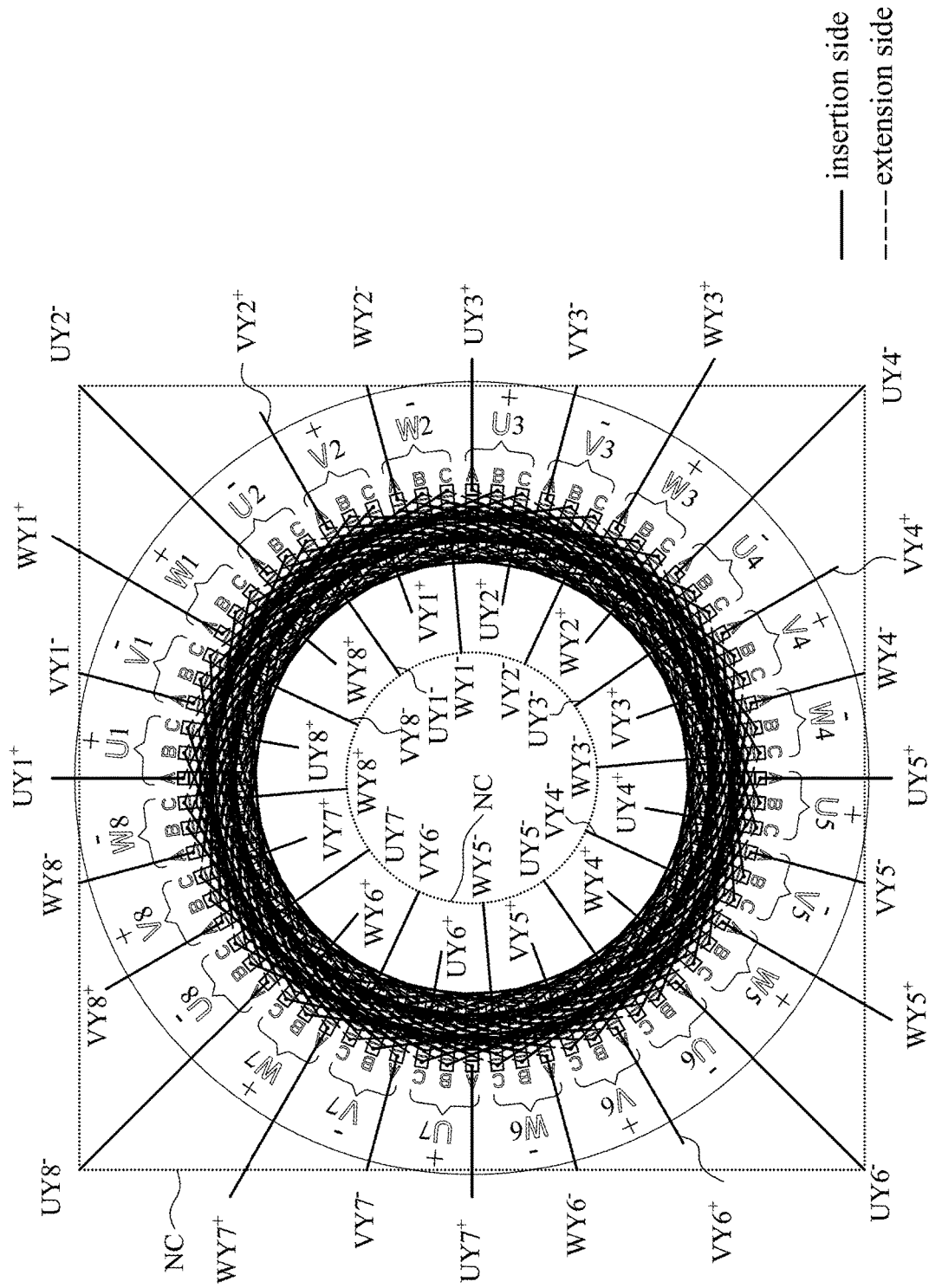
FIG. 9 illustrates 8 windings configured in U, V, W phases of a 72-slot motor stator according to an embodiment of the present disclosure.

Reference is made to FIG. 9, which illustrates 8 windings configured in U, V, W phases of a 72-slot motor stator according to an embodiment of the present disclosure. The positive ends (YN+) of the U-phase, V-phase, and W-phase 8 windings (Y1 to Y8) are respectively connected to corresponding U-phase, V-phase, and W-phase phase terminals, while The negative ends (YN−) of the U-phase, V-phase, and W-phase 8 windings (Y1 to Y8) are all connected to the neutral terminal NC.

The U-phase, V-phase, and W-phase 8 windings in FIG. 9 are all routed according to the same winding rules illustrated in FIG. 4 such that the span of the trans-layer connection wire on the insertion side is all 7 slots, and the common span (common pitch) of the transpolar hairpin wires on the insertion side is 10 slots.

Figure 10:
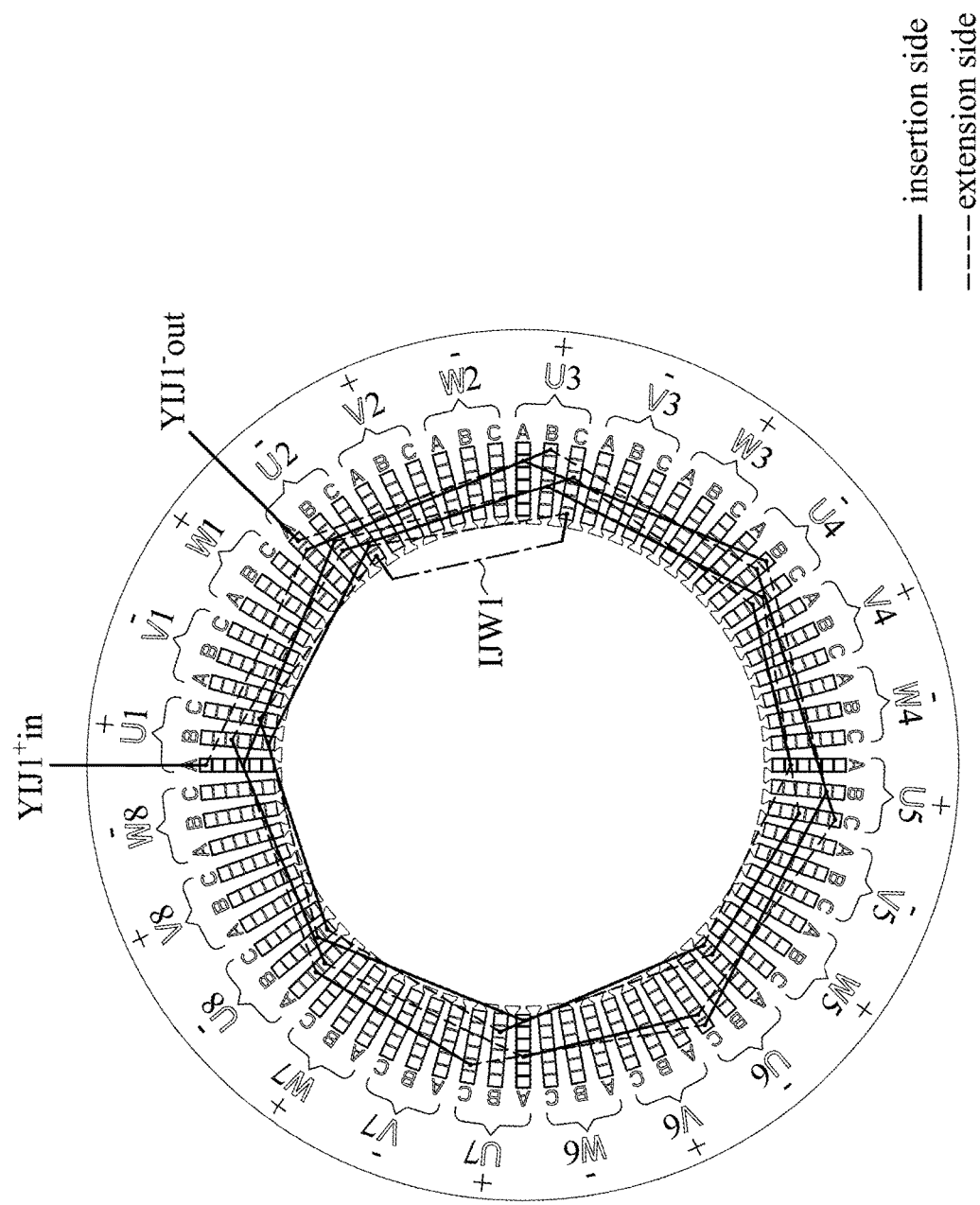
FIG. 10 illustrates one of the windings configured in U phases of a 72-slot motor stator using same-layer connection wires according to an embodiment of the present disclosure.

Reference is made to FIG. 10, which illustrates one of the windings configured in U phases of a 72-slot motor stator using same-layer connection wires (joining wire) according to an embodiment of the present disclosure. Continuing from the U-phase windings Y1 and Y2 in FIGS. 4 and 5, the U-phase winding Y1 in this embodiment uses a same-layer connection wire IJW1 to connect the U-phase windings Y1 and Y2 in FIGS. 4 and 5 to form a winding YIJ1.

Figure 11:
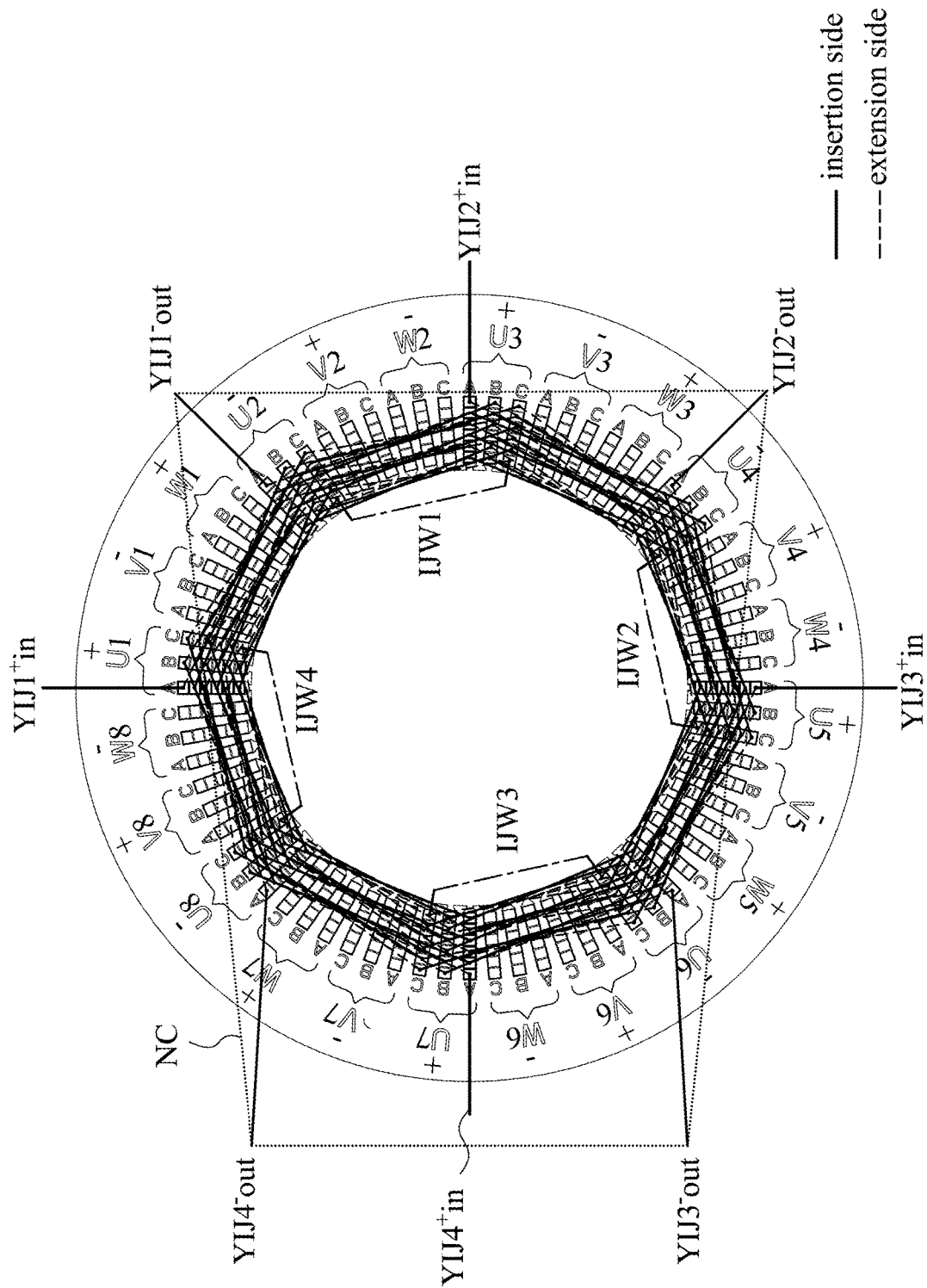
FIG. 11 illustrates 4 windings configured in U phases of a 72-slot motor stator using inner same-layer connection wires according to an embodiment of the present disclosure.

Reference is made to FIG. 11, which illustrates 4 windings configured in U phases of a 72-slot motor stator using inner same-layer connection wires according to an embodiment of the present disclosure. The same-layer connection wire in FIG. 10 is applied to the U-phase 8 windings in FIG. 6 to form the U-phase 4 windings.

Specifically, a same-layer connection wire IJW1 is used to connect inner wire ends of the U-phase windings Y1 and Y2 in FIG. 6, and s same-layer connection wire IJW2 is used to connect inner wire ends of the U-phase windingd Y3 and Y4 in FIG. 6, a same-layer connection wire IJW3 is used to connect inner wire ends of the U-phase windings Y5 and Y6 in FIG. 6, and a same-layer connection wire IJW4 is used to connect inner wire ends of the U-phase winding Y7 and Y8 in FIG. 6 to form windings YIJ1 to YIJ4 of U phase. The two ends of the same-layer connection wires (IJW1 to IJW4) are arranged in the same slot-position layer (L6) that is closest to the rotor accommodating space in the radial direction, and the span is a pole pitch (a distance between two phase slots C of the same phases across adjacent polar regions). Connecting the negative end (YIJN−out) of YIJ1 to YIJ4 to the neutral terminal NC, and connecting the positive end (YIJN+in) of YIJ1 to YIJ4 to the phase terminals of the U phase to form a parallel-connected U-phase windings YIJ1 to YIJ4. For the V-phase and W-phase 8 windings in FIGS. 7 and 8, the same-layer connection wires can also be used to connect the inner wire ends of the winding to achieve the parallel connection of the V-phase and W-phase winding YIJ1 to YIJ4. This embodiment has the same winding rules as the winding in FIG. 6 such that the span of the trans-layer connection wire on the insertion side is 7 slots, while the common pitch of the transpolar hairpin wires on the insertion side is 10 slots. In addition, the span of the same-layer connection wire on the insertion side is 9 slots (full pitch).

Figure 12:
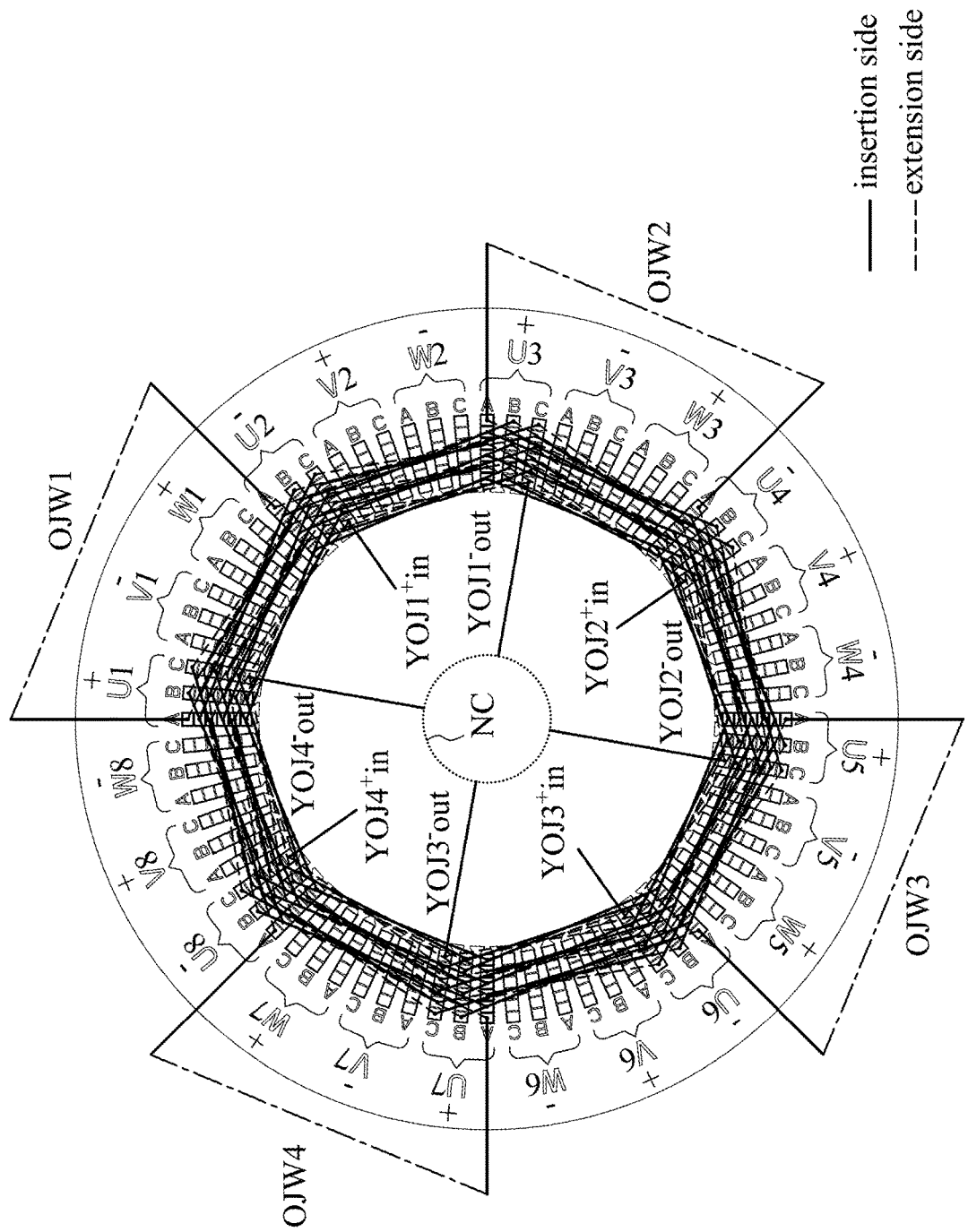
FIG. 12 illustrates 4 windings configured in U phases of a 72-slot motor stator using outer same-layer connection wires according to an embodiment of the present disclosure.

Reference is made to FIG. 12, which illustrates 4 windings configured in U phases of a 72-slot motor stator using outer same-layer connection wires according to an embodiment of the present disclosure. This embodiment also uses the same-layer connection wire to connect the U-phase 8 windings in FIG. 6 to form U-phase 4 windings. Different from the same-layer connection wire configuration in FIGS. 10 and 11, same-layer connection wires in this embodiment is used to connect outer wire ends of the windings. Specifically, a same-layer connection wire OJW1 is used to connect the outer wire ends of the U-phase windings Y1 and Y2 in FIG. 6, and a same-layer connection wire OJW2 is used to connect the outer wire ends of the U-phase windings Y3 and Y4 in FIG. 6. A same-layer connection wire OJW3 is used to connect the outer wire ends of the U-phase winding Y5 and Y6 in FIG. 6 and a same-layer connection wire OJW4 is used to connect the outer wire ends of the U-phase windings Y7 and Y8 in FIG. 6 to form U-phase windings YOJ1 to YOJ4 in this embodiment. The two ends of the same-layer connection wires (OJW1 to OJW4) are arranged on the same slot-position layer (i.e., L1) that is farthest from the rotor accommodating space in the radial direction, and the spans are all a pole pitch (a distance between two phase slots A of the same phases across adjacent polar regions). Connecting the negative ends (YOJN−out) of YOJ1 to YOJ4 to the neutral terminal NC, and connecting the positive end (YOJN+in) of YOJ1 to YOJ4 to the phase terminals of the U phase to form a parallel-connected U-phase windings YOJ1 to YOJ4. For the V-phase and W-phase 8 windings in FIGS. 7 and 8, the same-layer connection wires can also be used to connect the outer wire ends of the windings to achieve the parallel connection of the V-phase and W-phase windings YOJ1 to YOJ4.

Figure 13:
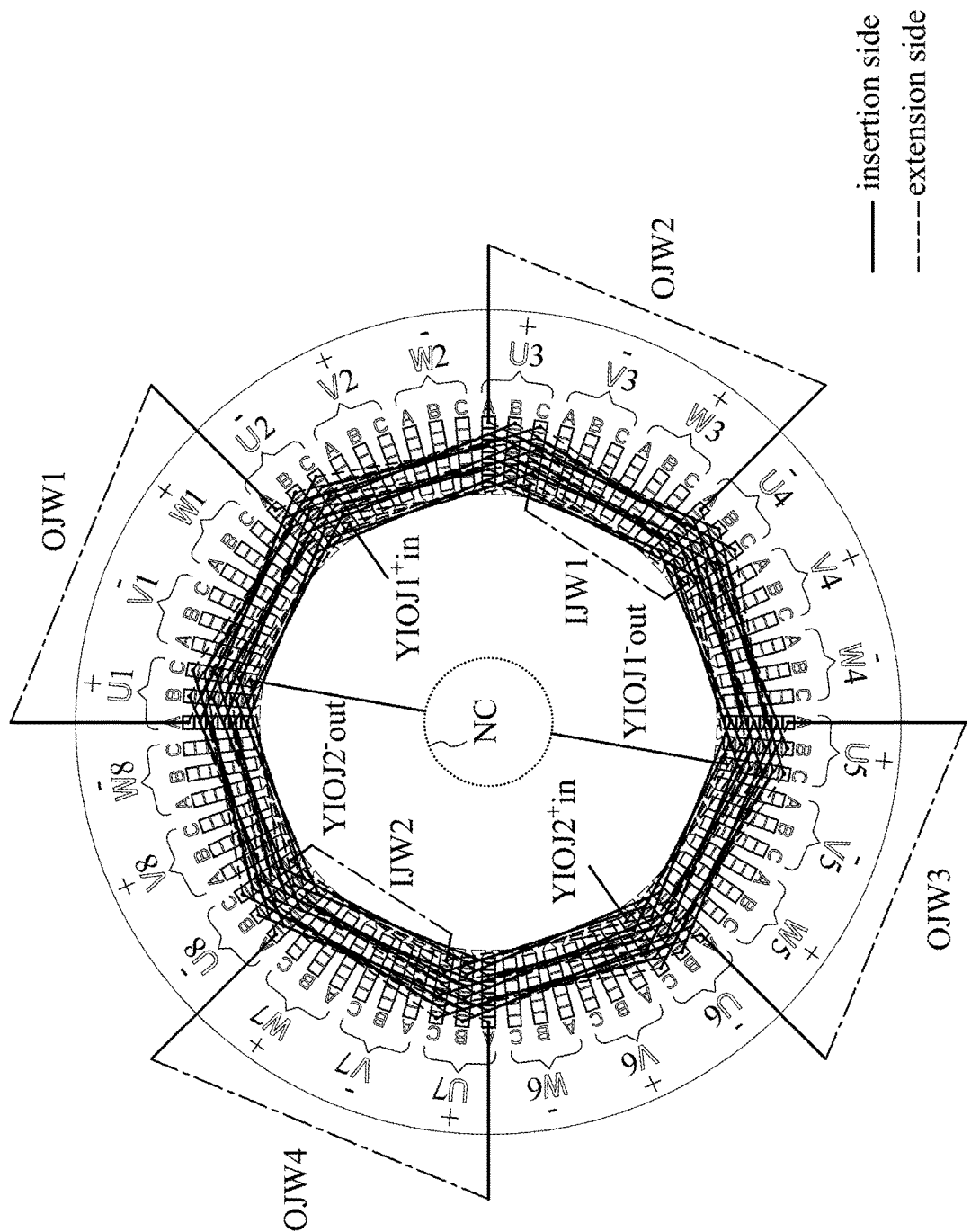
FIG. 13 illustrates 2 windings configured in U phases of a 72-slot motor stator using inner and outer same-layer connection wires according to an embodiment of the present disclosure.

Reference is made to FIG. 13, which illustrates 2 windings configured in U phases of a 72-slot motor stator using inner and outer same-layer connection wires according to an embodiment of the present disclosure. Continuing from the U-phase windings YOJ1 to YOJ4 in FIG. 12, a same-layer connection wire IJW1 is used in this embodiment to connect the inner side ends of the U-phase windings YOJ1 to YOJ2 in FIG. 11, and a same-layer connection wire IJW2 is used to connect the inner wire ends of the U-phase windings YOJ3 and YOJ4 in FIG. 11 to form the U-phase windings YOIJ1 and YOIJ2 in this embodiment. Connecting the negative ends of YOIJ1 and YOIJ2 (YOIJN−out) to the neutral terminal NC, and connect the positive ends of YOIJ1 and YOIJ2 (YOIJN+in) to the phase terminals of the U phase to form a parallel-connected U-phase windings YOIJ1 and YOIJ2.

Figure 14:
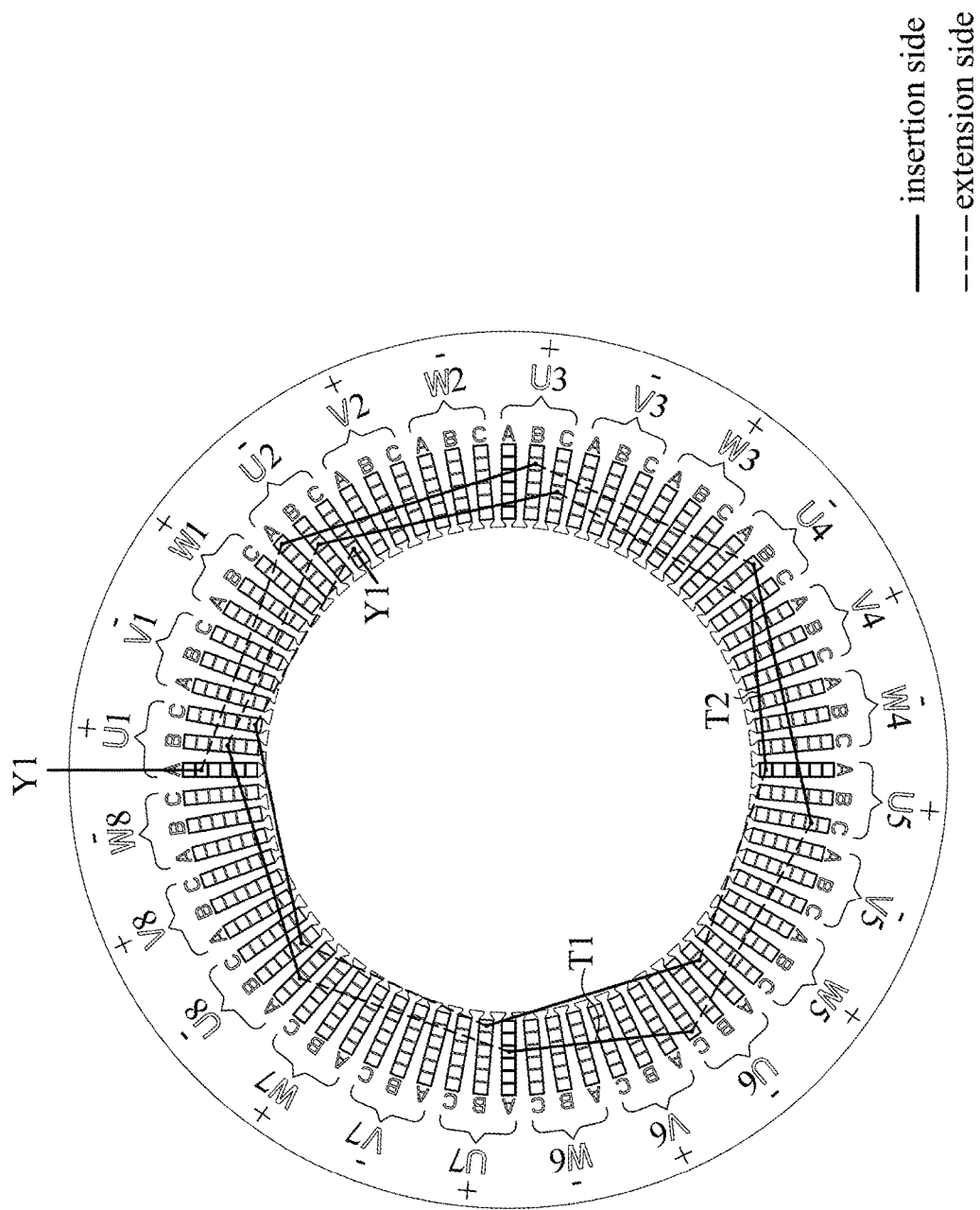
FIG. 14 illustrates one of the windings configured in U phases of a 72-slot motor stator according to another embodiment of the present disclosure.

Reference is made to FIG. 14, which illustrates one of the windings configured in U phases of a 72-slot motor stator according to another embodiment of the present disclosure. The winding method of this embodiment is slightly different from the winding method of the U phase in FIG. 4. Specifically, after the wire of winding Y1 is routed into the L2 layer of the phase slot A of the U1 phase from the insertion side of the stator core, it is then connected to the L1 layer of the phase slot A of the U2 phase on the extension side of the stator core, then connected to the L2 layer of phase slot B of phase U3 on the insertion side of the stator core, then connected to the L1 layer of phase slot B of the phase U4 on the extension side of the stator core, and then connected to the L2 layer of the phase slot C of the U5 phase on the insertion side of the stator core, and then connected to the L1 layer of the phase slot C of the U6 phase on the extension side of the stator core. At this point, the wires of winding Y1 has passed through the phase slots A, B, and C of the L1 layer once, and has also passed through the phase slots A, B, and C of the L2 layer once. A trans-layer connection wire T1 is then used to connect the L1 layer of phase slot C of phase U6 to the L4 layer of phase slot A of the phase U7 on the insertion side of the stator core, and then connected to the L3 layer of the phase slot A of the phase U8 on the extension side of the stator core, then connected to the L4 layer of the phase slot B of the U1 phase on the insertion side of the stator core, and connected to the L3 layer of the phase slot B of the U2 phase on the extension side of the stator core, then connected to the L4 layer of phase slot C of the phase U3 on the insertion side of the stator core, and then connected to the L3 layer of the phase slot C of the phase U4 on the extension side of the stator core. After the trans-layer connection wire T1, the wire of winding Y1 has passed through the phase slots A, B, and C of the L3 layer once, and also passed the phase slots A, B, and C of the L4 layer once. A trans-layer connection wire T2 is then used to connect the L3 layer of the phase slot C of the U4 phase to the L6 layer of the phase slot A of the U5 phase on the insertion side of the stator core, and then connected to the L5 layer of the phase slot A of the phase U6 on the extension side of the stator core, and then connected to the L6 layer of phase slot B of phase U7 on the insertion side of the stator core, and connected to the layer L5 of phase slot B of phase U8 on the extension side of the stator core, and then connected to the L6 layer of the phase slot C of the U1 phase on the insertion side of the stator core, and then connected to the L5 layer of the phase slot C of the U2 phase on the extension side of the stator core. After the trans-layer connection wire T2, the wire of winding Y1 has passed through the phase slots A, B, and C of the L5 layer once, and also passed through the phase slots A, B, and C of the L6 layer once, and is routed out at this point (The L5 layer of phase slot C of the phase U2). Similar to the embodiments in FIGS. 4 to 13, the same winding rules can be applied to the other windings of the U, V, and W phases. Although the winding method of this embodiment is slightly different from the winding method of the foregoing embodiments in FIGS. 4 to 13, the common span (common pitch) of the transpolar hairpin wires on the insertion side is still 10 (9+1) slots, and the span of the trans-layer connection wires T1 and T2 on the insertion side is also 7 slots.

Figure 15:
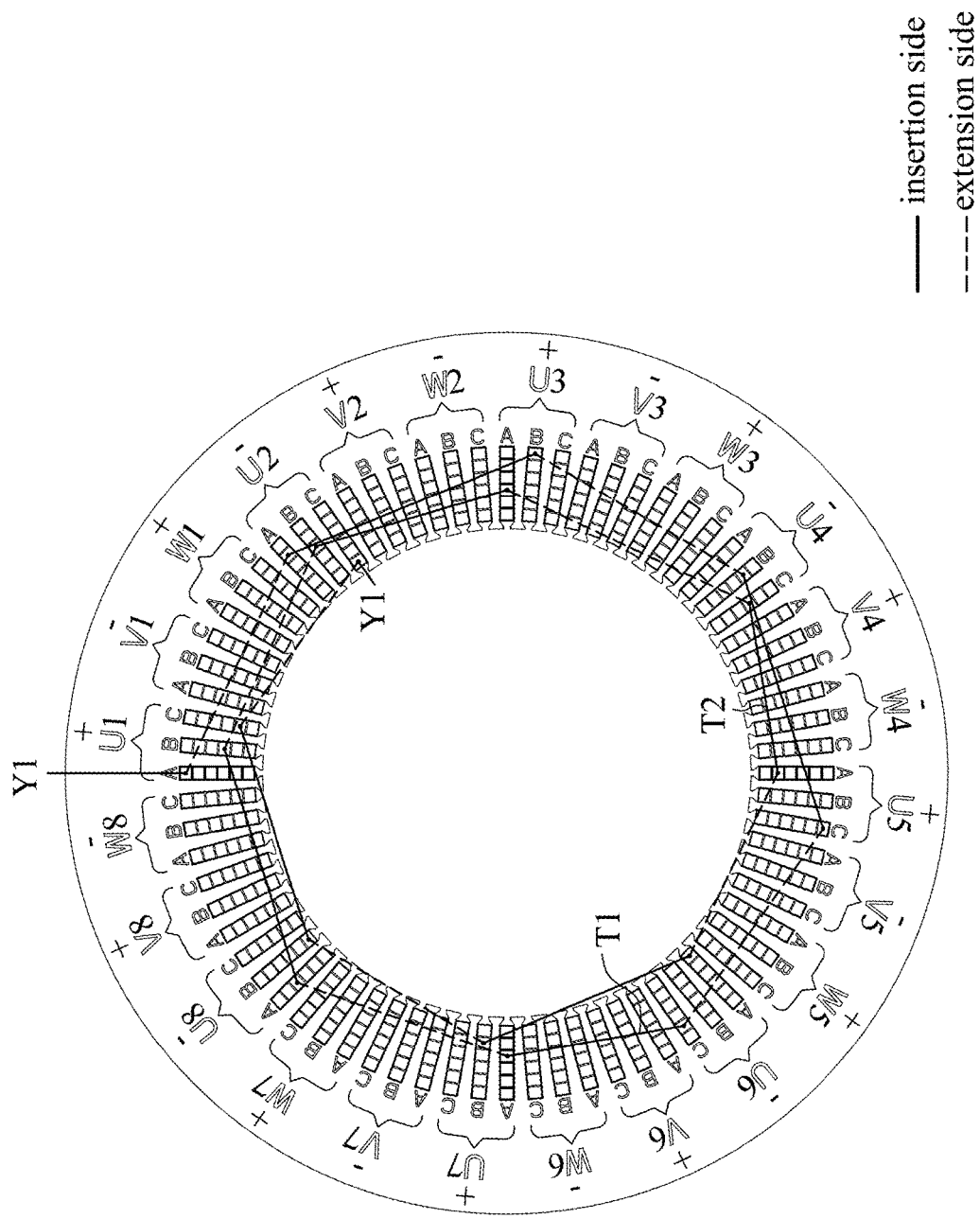
FIG. 15 illustrates one of the windings configured in U phases of a 72-slot motor stator according to still another embodiment of the present disclosure.

Reference is made to FIG. 15, which illustrates one of the windings configured in U phases of a 72-slot motor stator according to still another embodiment of the present disclosure. The winding method of this embodiment is slightly different from the winding method of the U phase in FIG. 4. Specifically, the wire of winding Y1 is routed from from the L1 layer of the phase slot A of the U1 phase on the insertion side of the stator core, and then connected to the L2 layer of the phase slot A of the U2 phase on the extension side of the stator core, then connected to the L1 layer of phase slot B of the phase U3 on the insertion side of the stator core, then connected to the L2 layer of phase slot B of phase U4 on the extension side of the stator core, and then connected to the L1 layer of the phase slot C of the U5 phase on the insertion side of the stator core, and then connected to the L2 layer of the phase slot C of the U6 phase on the extension side of the stator core. At this point, the wire of winding Y1 has passed through the phase slots A, B, and C of the L1 layer once, and has also passed through the phase slots A, B, and C of the L2 layer once. A trans-layer connection wire T1 is then used to connect the L2 layer of the phase slot C of the phase U6 to the L4 layer of phase slot A of the phase U7 on the insertion side of the stator core, and then connected to the L3 layer of the phase slot A of the phase U8 on the extension side of the stator core, then connected to the L4 layer of the phase slot B of the U1 phase on the insertion side of the stator core, and connected to the L3 layer of the phase slot B of the U2 phase on the extension side of the stator core, and then connected to the L4 layer of the phase slot C of the phase U3 on the insertion side of the stator core, and then connected to the L3 layer of the phase slot C of the phase U4 on the extension side of the stator core. After the trans-layer connection wire T1, the wire of winding Y1 has passed through the phase slots A, B, and C of the L3 layer once, and also passed the phase slots A, B, and C of the L4 layer once. A trans-layer connection wire T2 is then used to connect the L3 layer of phase slot C of the phase U4 to the L5 layer of phase slot A of the phase U5 on the insertion side of the stator core, and then connected to L6 layer of phase slot A of phase U6 on the extension side of the stator core, then connected to L5 layer of phase slot B of the phase U7 on the insertion side of the stator core, and then connected to L6 layer of the phase slot B of the phase U8 on the extension side of the stator core, then connected to the L5 layer of the phase slot C of the U1 phase on the insertion side of the stator core, and then connected to the L6 layer of the phase slot C of the U2 phase on the extension side of the stator core. After the trans-layer connection wire T2, the wire of winding Y1 has passed through the phase slots A, B, and C of the L5 layer once, and also passed the phase slots A, B, and C of the L6 layer once, and routed out at this point (L6 layer of phase slot C of phase U2). The main difference between the winding method of this embodiment and the winding method of the U phase in FIG. 4 lies in the winding principle of the L3 to L4 layer. Similar to the embodiments in FIGS. 4 to 13, the same winding rules in this embodiment can be applied to the other windings of the U, V, and W phases. Although the winding method of this embodiment is slightly different from that of the U phase in FIG. 4, the common span (common pitch) of the transpolar hairpin wires on the insertion side is still 10 (9+1) slots, while the span of the trans-layer connection wires T1 and T2 on the insertion side is also 7 slots.

Figure 16:
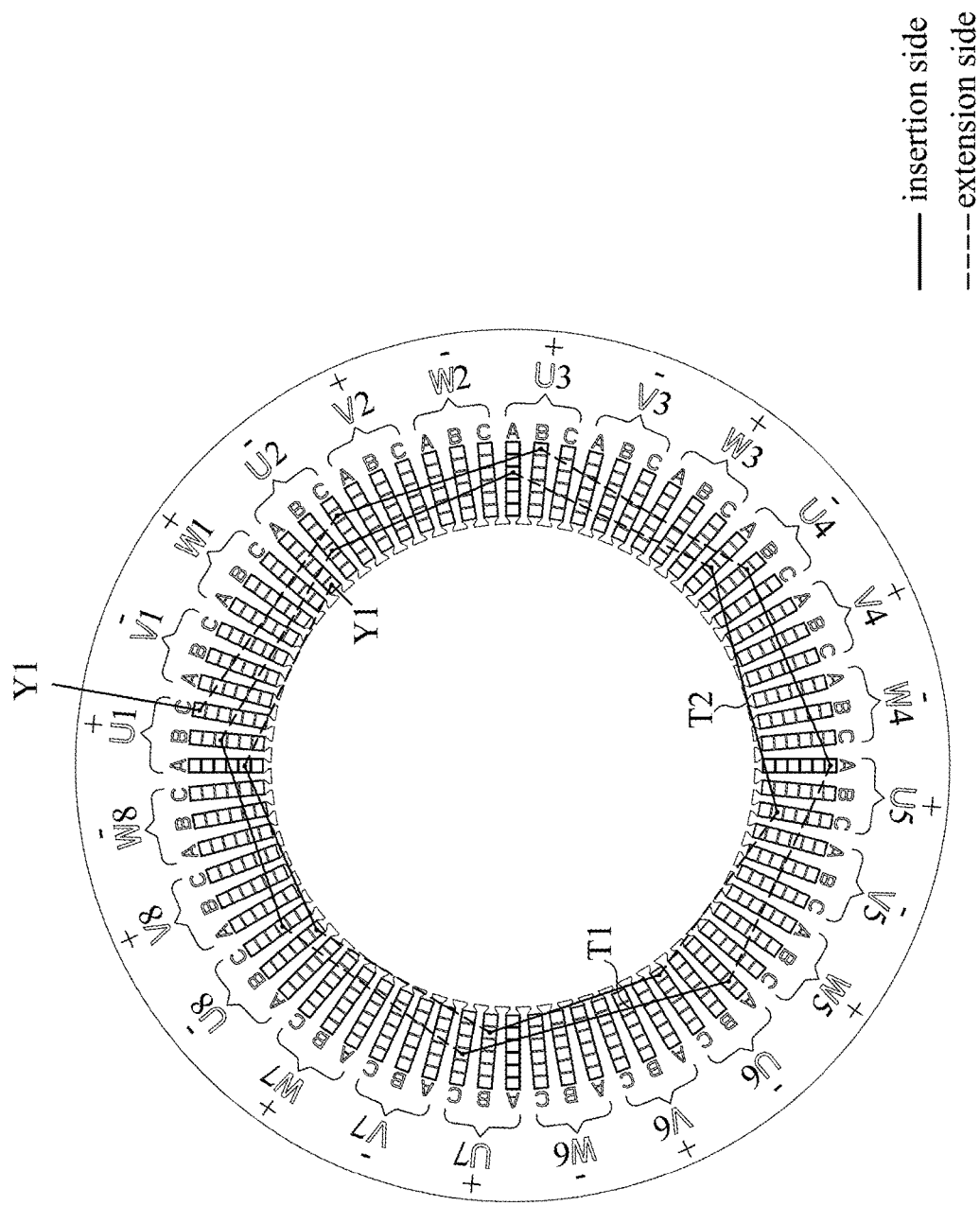
FIG. 16 illustrates one of the windings configured in U phases of a 72-slot motor stator according to still another embodiment of the present disclosure.

Reference is made to FIG. 16 illustrates one of the windings configured in U phases of a 72-slot motor stator according to still another embodiment of the present disclosure. The winding method of this embodiment is slightly different from the winding method of the U phase in FIG. 4. Specifically, after the wire of winding Y1 is routed into the L1 layer of the phase slot C of the phase U1 from the insertion side of the stator core, it is then connected to the L2 layer of the phase slot C of the phase U2 on the extension side of the stator core, then connected to the L1 layer of phase slot B of the phase U3 on the insertion side of the stator core, then connected to the L2 layer of phase slot B of the phase U4 on the extension side of the stator core, and then connected to the L1 layer of phase slot A of the U5 phase on the insertion side of the stator core, and then connected to the L2 layer of the phase slot A of the U6 phase on the extension side of the stator core. At this point, the wire of winding Y1 has passed through the phase slots A, B, and C of L1 layer once, and also passed through the phase slots A, B, and C of the L2 layer once. The difference from the previous embodiment is that a sequence of crossing the phase slots is from C to B to A. A trans-layer connection wire T1 is then used to connect the L2 layer of phase slot A of phase U6 to the L3 layer of phase slot C of phase U7 on the insertion side of the stator core, and then connected to the L4 layer of phase slot C of the phase U8 on the extension side of the stator core, and connected to the L3 layer of phase slot B of phase U1 on the insertion side of the stator core, and the L4 layer of phase slot B of the phase U2 on the extension side of the stator core, and then connected to the L3 layer of phase slot A of U3 phase on the insertion side of the stator core, and then connected to the L4 layer of phase slot A of the phase U4 on the extension side of the stator core. After the trans-layer connection wire T1, the wire of winding Y1 has passed through the phase slots A, B, and C of the L3 layer once, and also passed the phase slots A, B, and C of the L4 layer once, the sequence is from C to B to A for the phase slots. A trans-layer connection wire T2 is then used to connect the L4 layer of phase slot A of the phase U4 to the L5 layer of phase slot C of the phase U5 on the insertion side of the stator core, and then connected to the L6 layer of the phase slot C of the phase U6 on the extension side of the stator core, then connected to L5 layer of phase slot B of the phase U7 on the insertion side of the stator core, and then connected to layer L6 of phase slot B of U8 phase on the extension side of the stator core, then connected to the L5 layer of phase slot A of the phase U1 on the insertion side of the stator core, and then connected to the L6 layer of phase slot A of the phase U2 on the extension side of the stator core. After the trans-layer connection wire T2, the wire of winding Y1 has passed through the phase slots A, B, and C of the L5 layer once, and also passed the phase slots A, B, and C of the L6 layer once, the sequence is from from C to B to A for the phase slots, and routed out at this point. In some embodiments of the present disclosure, when an inlet end of winding Y1 is inserted into a rightmost one (e.g., phase slot C) of the phase slots of the same phases of the polar regions (e.g., U1 to U8), an outlet end of winding Y1 is inserted a leftmost one (e.g., phase slot A) of the phase slots of the same phases of the polar regions. As in the foregoing embodiments, the same winding rules in this embodiment can be applied to the other windings of the U, V, and W phases. The pole pitch or full pitch calculation method of this embodiment is obtained by dividing 72 slots by 8 (polar regions), which is 9 slots. The common span (common pitch) of transpolar hairpin wires on the insertion side is 8 (9-1) slots. In other words, when the inlet end of the winding Y1 is inserted into the rightmost one (such as phase slot C) of the phase slots of the same phases (such as U1 to U8), the common span (8) is equal to a quotient (9), which is obtained by dividing a total number of these (phase) slots (72) by a total number of polar regions (8), minus 1. In addition to the transpolar hairpin wires, the span of the trans-layer connection wires T1 and T2 is 11 slots on the insertion side. The span (11 slots) of the trans-layer connection wire can be obtained from the common span 8 slots plus the quantity (Q=3) of phase slots for each phase.

Figure 17:
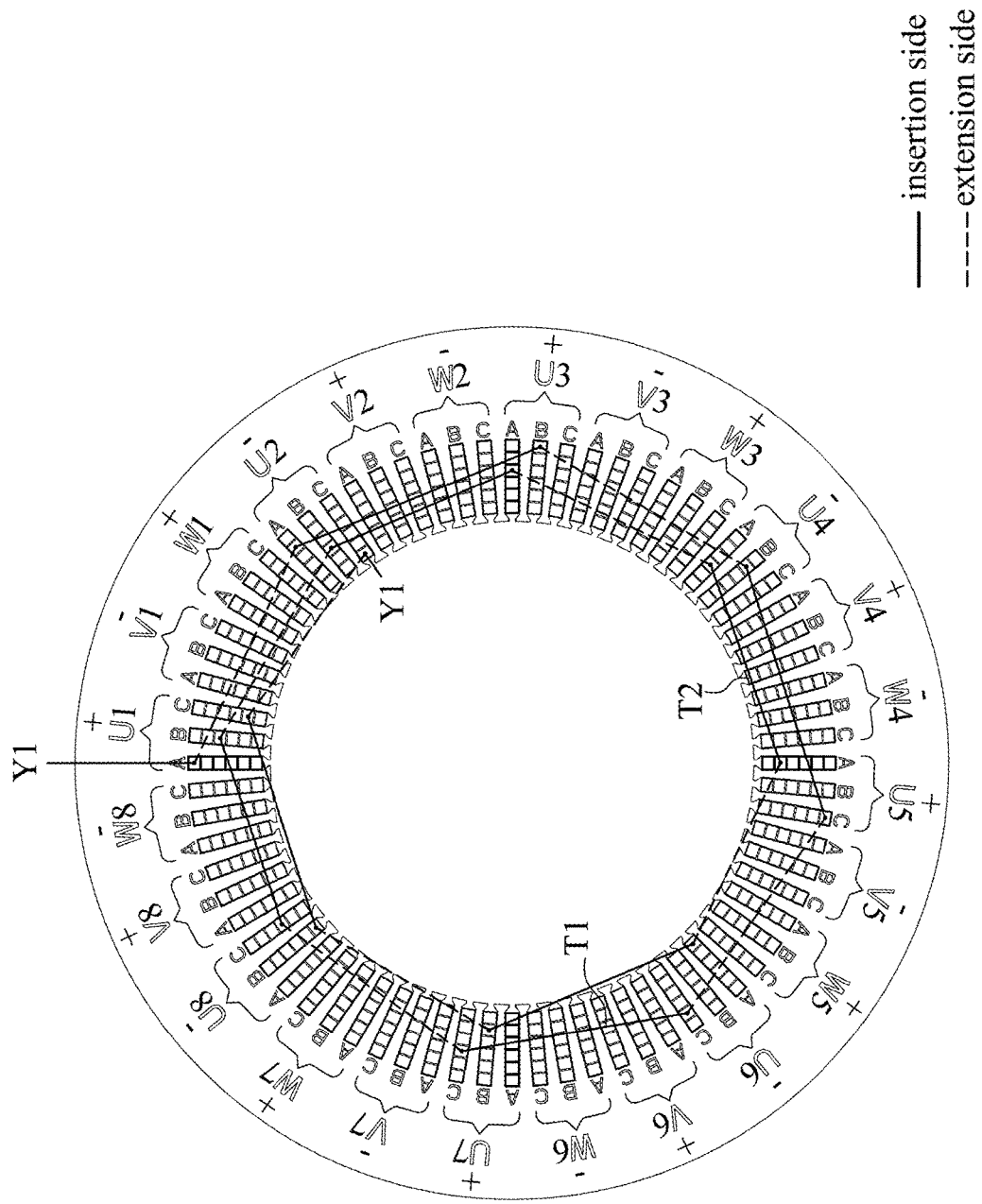
FIG. 17 illustrates one of the windings configured in U phases of a 72-slot motor stator according to still another embodiment of the present disclosure.

Reference is made to FIG. 17, which illustrates one of the windings configured in U phases of a 72-slot motor stator according to still another embodiment of the present disclosure. The winding method of this embodiment is slightly different from the winding method of the U phase in FIG. 4. Specifically, the wire of winding Y1 is routed into the L1 layer of the phase slot A of the U1 phase on the insertion side of the stator core from, and then connected to the L2 layer of the phase slot A of the U2 phase on the extension side of the stator core, then connected to the L1 layer of phase slot B of the phase U3 on the insertion side of the stator core, then connected to the L2 layer of phase slot B of the phase U4 on the extension side of the stator core, and then connected to the L1 layer of the phase slot C of the U5 phase on the insertion side of the stator core, and then connected to the L2 layer of the phase slot C of the U6 phase on the extension side of the stator core. At this point, the wire of winding Y1 has passed through the phase slots A, B, and C of the L1 layer once, and also passed the phase slots A, B, and C of the L2 layer once, and the sequence of the phase slots is from A to B to C. A trans-layer connection wire T1 is then used to connect the L2 layer of the phase slot C of the U6 phase to the L3 layer of the phase slot C of the U7 phase on the insertion side of the stator core, and then connected to the L4 layer of phase slot C of the phase U8 on the extension side of the stator core, and connected to the L3 layer of phase slot B of the phase U1 on the insertion side of the stator core, and connected to the L4 layer of phase slot B of the phase U2 on the extension side of the stator core, then connected to the L3 layer of phase slot A of the phase U3 on the insertion side of the stator core, and then connected to the L4 layer of phase slot A of the phase U4 on the extension side of the stator core. After the trans-layer connection wire T1, the wire of winding Y1 has passed through the phase slots A, B, and C of the L3 layer once, and also passed the phase slots A, B, and C of the L4 layer once, but the sequence is from C to B to A for the phase slots. A trans-layer connection wire T2 is then used to connect the L4 layer of phase slot A of phase U4 to the L5 layer of the phase slot A of the phase U5 on the insertion side of the stator core, and then connected to L6 layer of phase slot A of the phase U6 on the extension side of the stator core, then connected to the L5 layer of phase slot B of the U7 phase on the insertion side of the stator core, and then connected to the L6 layer of phase slot B of the U8 phase on the extension side of the stator core, then connected to the L5 layer of the phase slot C of the U1 phase on the insertion side of the stator core, and then connected to the L6 layer of the phase slot C of the U2 phase on the extension side of the stator core. After the trans-layer connection wire T2, the wire of winding Y1 has passed through the phase slots A, B, and C of the L5 layer once, and also passed the phase slots A, B, and C of the L6 layer once, the sequence is from A to B to C for the phase slots, and routed out at this point. The main difference between the winding method of this embodiment and the winding method of the U phase in FIG. 4 lies in the winding principle of the L3 to L4 layer. As in the foregoing embodiment, the same winding rules in this embodiment can be applied to the other windings of the U, V, and W phases. The pole pitch or full pitch calculation method of this embodiment is obtained by dividing 72 slots by 8 (polar regions), which is 9 slots. The common span (common pitch) of the transpolar hairpin wires of L1 to L2 layers and L5 to L6 layers on the insertion side is 10 (9+1) slots, while the common pitch of the transpolar hairpin wires of L3 to L4 layers on the insertion side is 8 (9-1) slots. In addition to the transpolar hairpin wires, the span of the trans-layer connection wires T1 and T2 is 9 slots on the insertion side. In some embodiments of the present disclosure, the trans-layer connection wires T1 and T2 cross two adjacent slot-position layers, and two ends of the trans-layer connection wire are spaced by a pole pitch. For example, the trans-layer connection wire T1 crosses from a phase slot C to another phase slot C of the same phases across adjacent polar regions, and the trans-layer connection wire T2 crosses from a phase slot A to another phase slot A of the same phases across adjacent polar regions.

Figure 18:
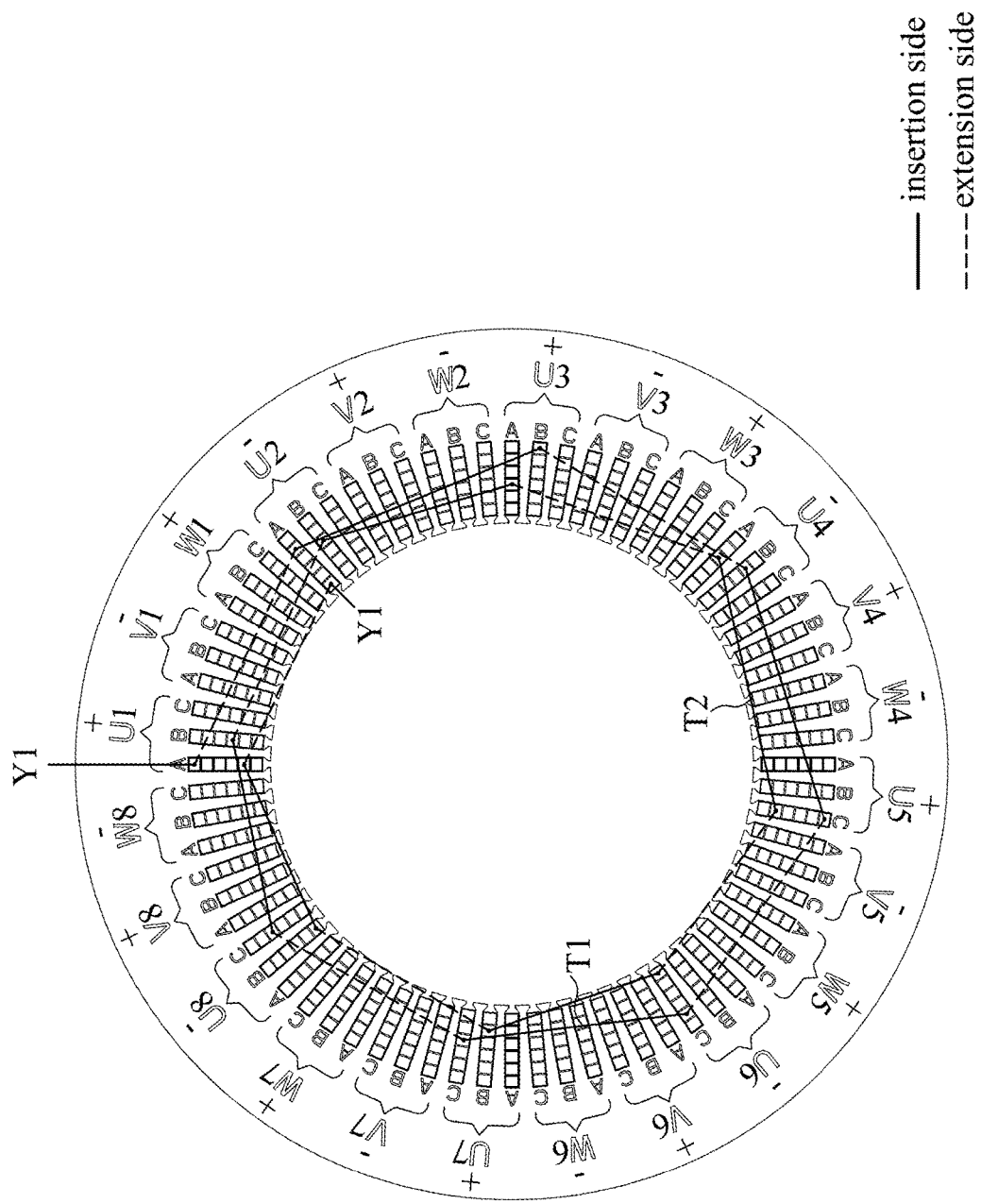
FIG. 18 illustrates one of the windings configured in U phases of a 72-slot motor stator according to still another embodiment of the present disclosure.

Reference is made to FIG. 18, which illustrates one of the windings configured in U phases of a 72-slot motor stator according to still another embodiment of the present disclosure. The winding method of this embodiment is slightly different from the winding method of the U phase in FIG. 4. Specifically, the wire of winding Y1 is routed into the L1 layer of the phase slot A of the U1 phase on the insertion side of the stator core, and then connected to the L2 layer of the phase slot A of the U2 phase on the extension side of the stator core, then connected to the L1 layer of phase slot B of the phase U3 on the insertion side of the stator core, then connected to the L2 layer of the phase slot B of the phase U4 on the extension side of the stator core, and then connected to the L1 layer of the phase slot C of the U5 phase on the insertion side of the stator core, and then connected to the L2 layer of the phase slot C of the U6 phase on the extension side of the stator core. At this point, the wire of winding Y1 has passed through the phase slots A, B, and C of L1 layer once, and also passed through the phase slots A, B, and C of the L2 layer once, the sequence is from A to B to C. A trans-layer connection wire T1 is then used to connect the L2 layer of the phase slot C of the U6 phase to the L4 layer of the phase slot C of the U7 phase on the insertion side of the stator core, and then connected to the L3 layer of the phase slot C of the phase U8 on the extension side of the stator core, then connected to the L4 layer of the phase slot B of the U1 phase on the insertion side of the stator core, and connected to the L3 layer of the phase slot B of the U2 phase on the extension side of the stator core, then connected to the L4 layer of phase slot A of the phase U3 on the insertion side of the stator core, and then connected to the L3 layer of the phase slot A of the phase U4 on the extension side of the stator core. After the trans-layer connection wire T1, the wire of winding Y1 has passed through the phase slots A, B, and C of the L3 layer once, and also passed the phase slots A, B, and C of the L4 layer once, the sequence is from C to B to A. A trans-layer connection wire T2 is then used to connect the L3 layer of the phase slot A of the U4 phase to the L5 layer of the phase slot C of the U5 phase on the insertion side of the stator core, and then connected to the L6 layer of phase slot C of the phase U6 on the extension side of the stator core, then connected to L5 layer of phase slot B of phase U7 on the insertion side of the stator core, and then connected to layer L6 of phase slot B of the phase U8 on the extension side of the stator core, then connected to the L5 layer of phase slot A of U1 on the insertion side of the stator core, and then connected to the L6 layer of phase slot A of U2 on the extension side of the stator core. After the trans-layer connection wire T2, the wire of winding Y1 has passed through the phase slots A, B, and C of the L5 layer once, and also passed the phase slots A, B, and C of the L6 layer once, the sequence is from C to B to A, and routed out at this point. The main difference between the winding method of this embodiment and the winding method of the U phase in FIG. 4 lies in the winding principle of the L3 to L4 layer and the L5 to L6 layer. The same winding rules in this embodiment can be applied to the other windings of the U, V, and W phases. The pole pitch or full pitch calculation method of this embodiment is obtained by dividing 72 slots by 8 (polar regions), which is 9 slots. The common span (common pitch) of the transpolar hairpin wires of the L1 to L2 layers on the insertion side is 10 (9+1) slots, while the common span (common pitch) of the transpolar hairpin wires on the insertion side of the L3 to L4 layers and the L5 to L6 layers is 8 (9-1) slots. In addition to transpolar hairpin wires, the trans-layer connection wire T1 has a 9-slot span on the insertion side, and the trans-layer connection wire T2 has an 11-slot span on the insertion side.

When the winding methods in FIGS. 13 to 18 is applied to the other windings of the U, V, and W phases, it can also be used with the same-layer connection wire to change the number of parallel-connected windings. In all the embodiments, the radially innermost layer and outermost layer have advantages in the manufacturing process that it is easier to connect the ends from the radially innermost layer and outermost layer to the phase terminal/neutral terminal, or extend to connect to other connection endpoints (e.g., the same-layer connection wire).

Figure 19:
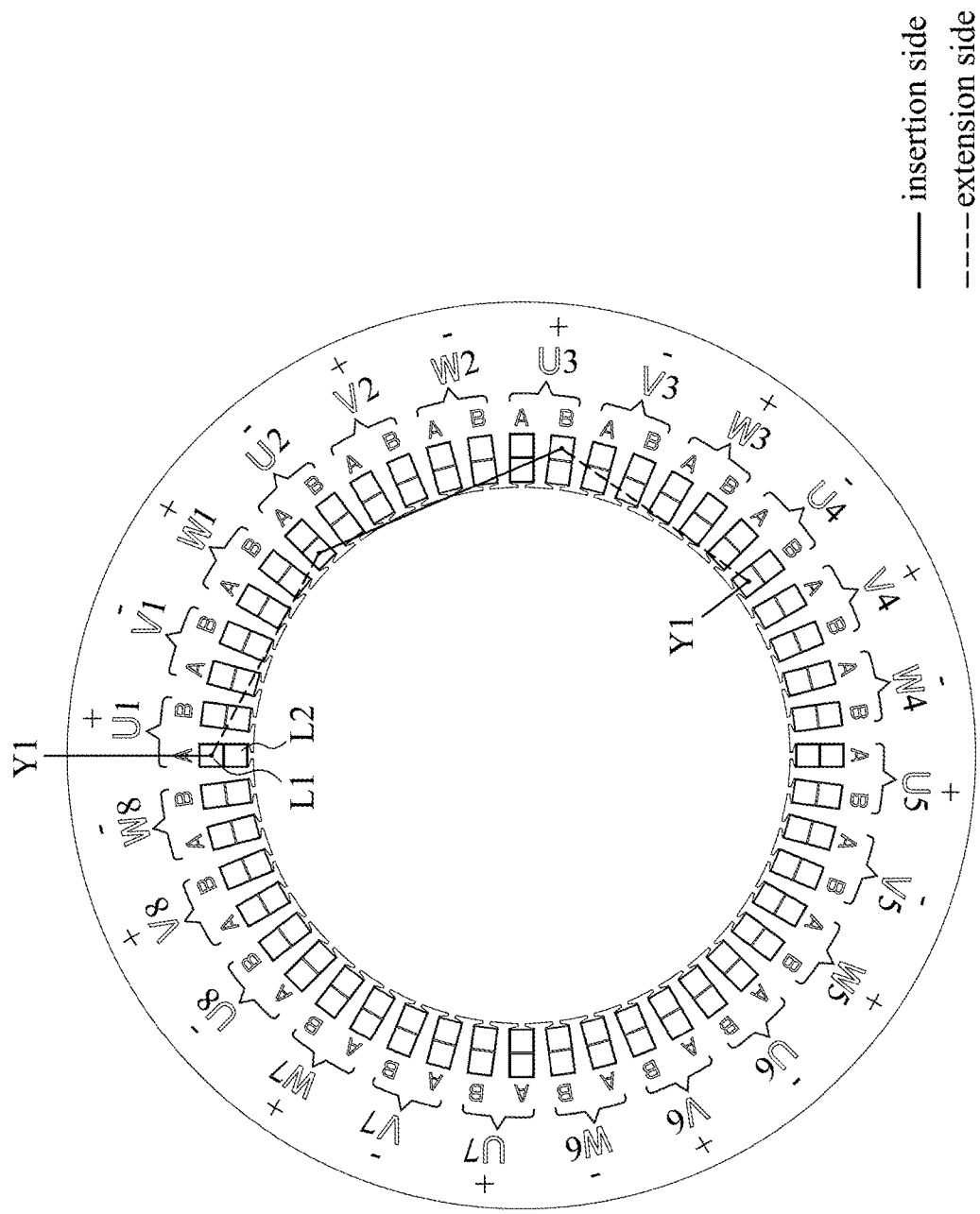
FIG. 19 illustrates one of the windings configured in U phases of a 48-slot motor stator according to an embodiment of the present disclosure.

Reference is made to FIG. 19, which illustrates one of the windings configured in U phases of a 48-slot motor stator according to an embodiment of the present disclosure. Different from the aforementioned 72-slot, 6-layer wire motor stator, this embodiment uses an 8-polar region, 48-slot, 2-layer wire motor stator to implement the circuit 50. Each (phase) slot (A, B) includes radially adjacent slot-positions (i.e., "squares" in each (phase) slot (A, B,)), and each slot-position can accommodate one hairpin wire. All slot-positions surround the rotor accommodating space in the circumferential direction, and form a plurality of slot-position layers (L1 to L2) adjacent in the radial direction. Each polar region has U, V, and W phases. For example, the first polar region has U1, V1, and W1 phases, the second polar region has U2, V2, and W3 phases . . . . The 8th polar region has U8, V8, and W8 phases. Each phase has multiple phase slots, such as phase slot A (left) and phase slot B (right) in the circumferential direction. The 48 (phase) slots in this embodiment are equal to: 8 (polar region)×3 (phase/polar region)×2 (slot/phase). Each (phase) slot allows 2 hairpin wires to be inserted into 2 slot-position layers from the outside to the inside for L1 to L2 layers. If you want to implement U, V, and W phases with 8 parallel-connected windings (the number of parallel-connected windings is equal to the total number of polar regions), take the U phase first as an example. The winding Y1 wire is routed into the L1 layer of the phase slot A of the U1 phase on the insertion side of the stator core, and then connected to the L2 layer of phase slot A of phase U2 on the extension side of the stator core, and then connected to the layer L1 of the phase slot B of phase U3 on the insertion side of the stator core, then connected to the layer L2 of the phase slot B of the phase U4 on the extension side of the stator core. At this point, the wire of winding Y1 has passed through the phase slots A and B of the L1 layer once, and also passed the phase slots A and B of the L2 layer once, the sequence is from A to B, and routed out at this point. The pole pitch or full pitch of winding Y1 is calculated by dividing 48 slots by 8 (polar regions), which is equal to 6 slots. The common span (common pitch) of the transpolar hairpin wires on the insertion side is 7 (6+1) slots.

Figure 20:
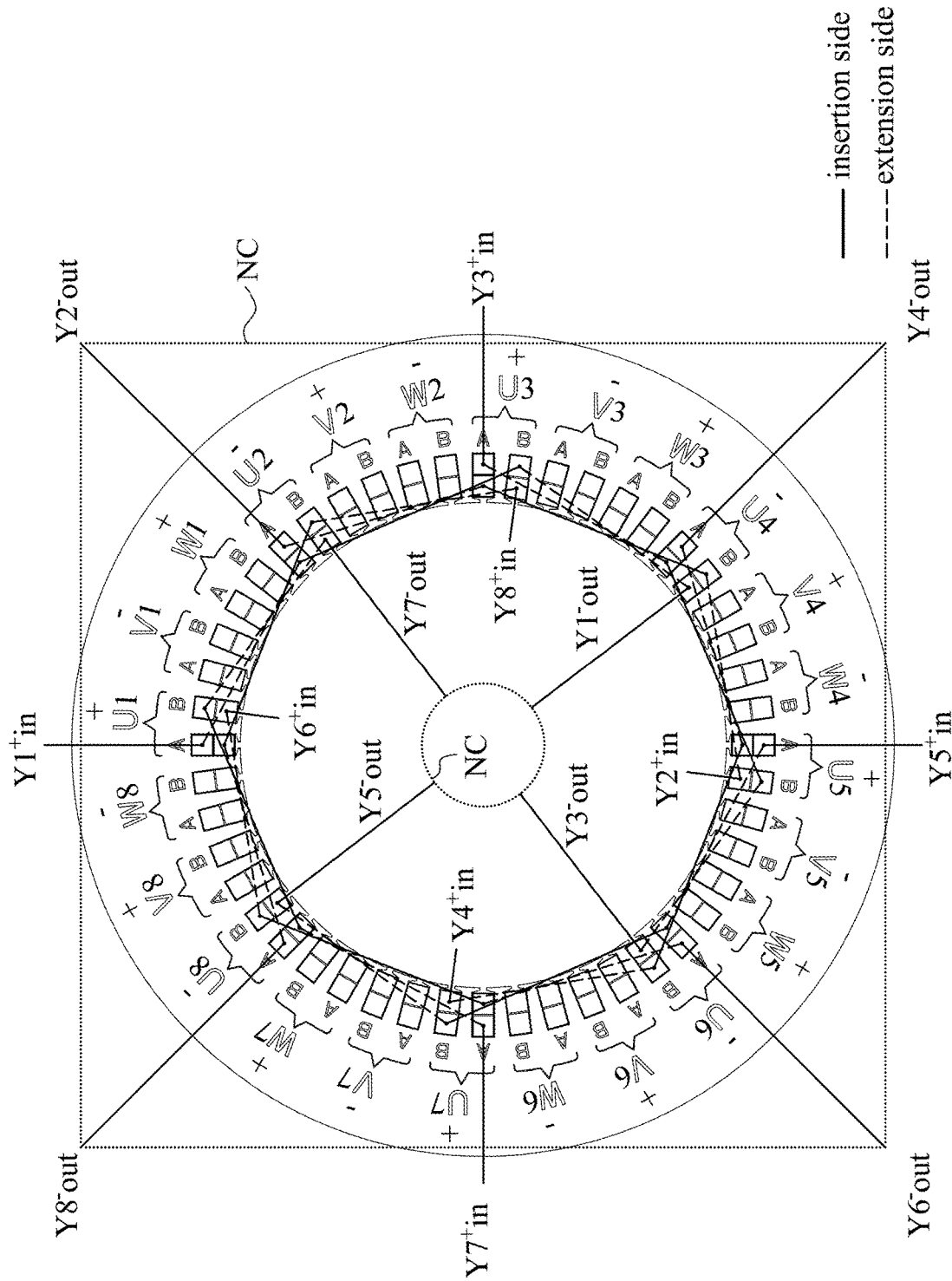
FIG. 20 illustrates 8 windings configured in U phases of a 48-slot motor stator according to an embodiment of the present disclosure.

Reference is made to FIG. 20, which illustrates 8 windings configured in U phases of a 48-slot motor stator according to an embodiment of the present disclosure. Continuing from the winding Y1 in FIG. 19, the windings Y2 to Y8 are executed according to the same winding principle. The winding Y2 is routed into the L1 layer of the phase slot A of the U2 phase on the insertion side of the stator core, and routed out from the L2 layer of the phase slot B of the U5 phase. The winding Y3 is routed into the L1 layer of the phase slot A of the phase U3 on the insertion side of the stator core, and routed out from the L2 layer of the phase slot B of the phase U6. The winding Y4 is routed into the L1 layer of the phase slot A of the phase U4 on the insertion side of the stator core, and routed out from the L2 layer of the phase slot B of the phase U7. The winding Y5 is routed into the L1 layer of the phase slot A of the phase U5 on the insertion side of the stator core, and routed out from the L2 layer of the phase slot B of the U8 phase. The winding Y6 is routed into the L1 layer of the phase slot A of the phase U6 on the insertion side of the stator core, and routed out from the L2 layer of the phase slot B of the phase U1. The winding Y7 is routed into the L1 layer of the phase slot A of the phase U7 on the insertion side of the stator core from, and routed out from the L2 layer of the phase slot B of the phase U2. The winding Y8 is routed into the L1 layer of the phase slot A of the phase U8 on the insertion side of the stator core, and routed out from the L2 layer of the phase slot B of the phase U3. U-phase windings Y1 to Y8 wires occupy all phase slots and slot-positions of U1 to U8 phases. Connecting the negative ends (YN−out) of Y1 to Y8 to the neutral terminal NC, and connecting the positive ends (YN+ in) of Y1 to Y8 to the phase terminals of the U phase to form U-phase parallel-connected windings Y1 to Y8. The winding methods of windings Y1 to Y8 in FIG. 20 are the same as those of winding Y1 in FIG. 19 such that the pole pitch or full pitch of the winding is the same as 6 slots. The common span (common pitch) of transpolar hairpin wires on the insertion side is still 7 (6+1) slots. No trans-layer connection wire is used.

Figure 21:
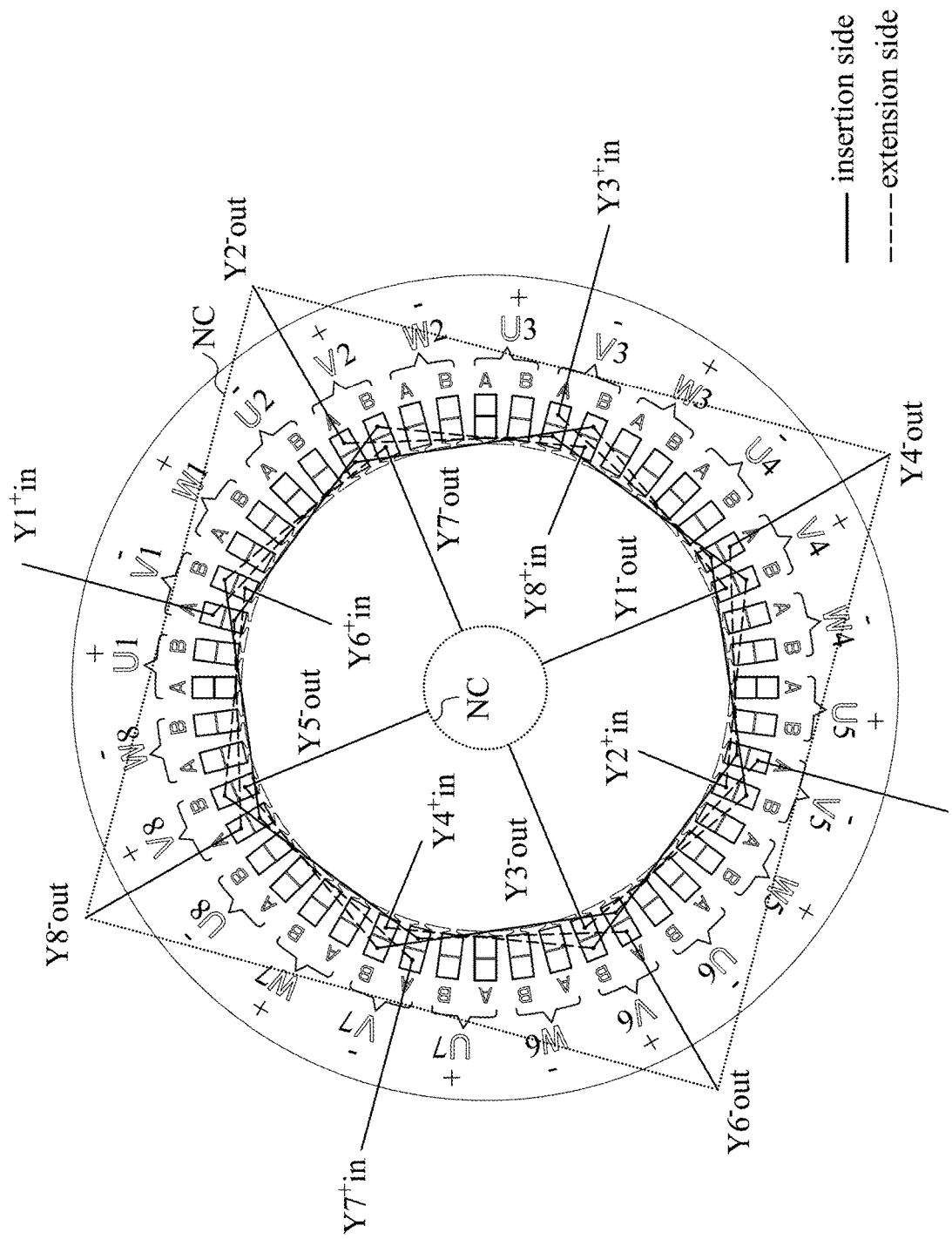
FIG. 21 illustrates 8 windings configured in V phases of a 48-slot motor stator according to an embodiment of the present disclosure.
Figure 22:
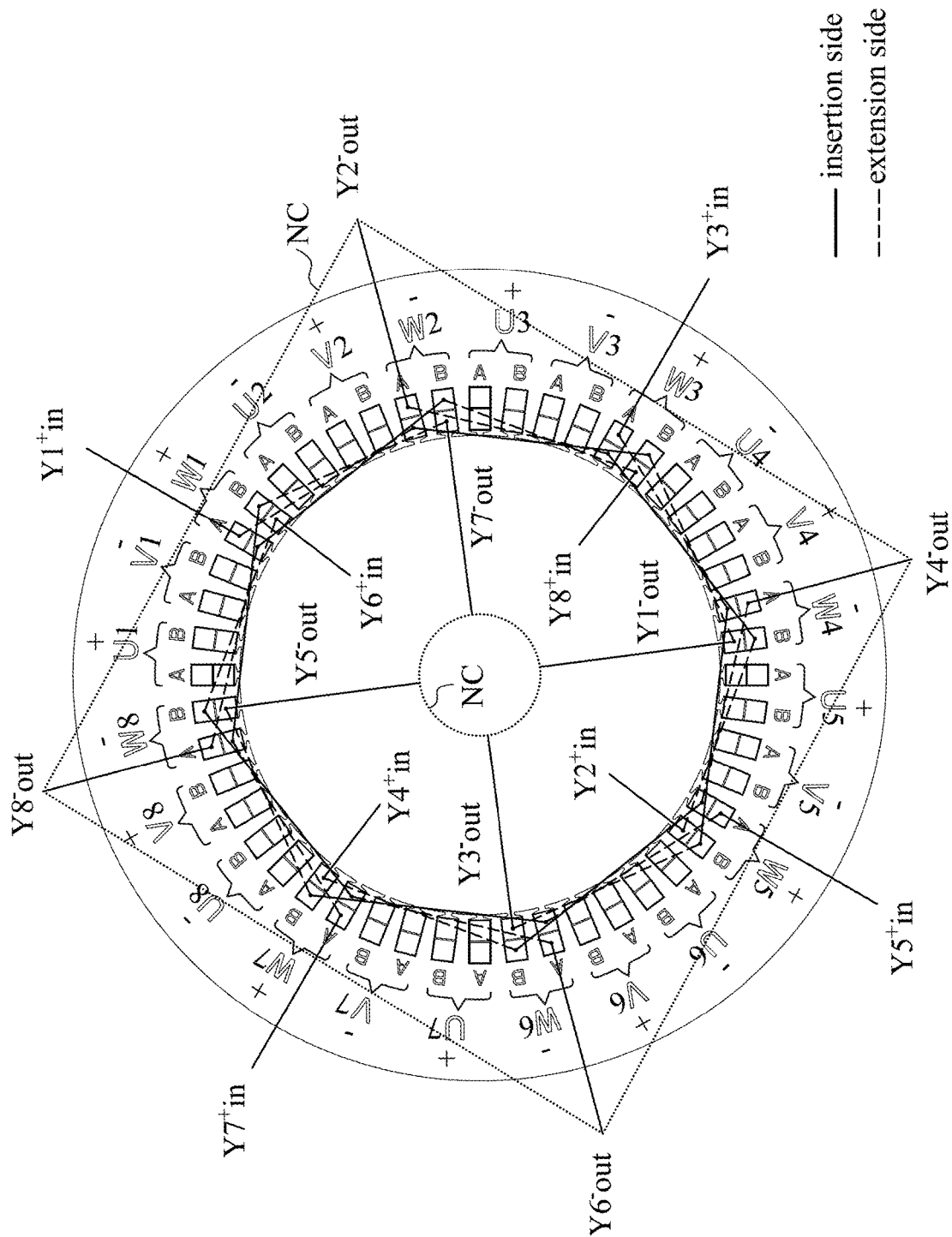
FIG. 22 illustrates 8 windings configured in W phases of a 48-slot motor stator according to an embodiment of the present disclosure.

Reference is made to FIGS. 21 and 22, which illustrates 8 windings configured in V phases and W phases of a 48-slot motor stator respectively. Continuing from the U-phase winding in FIG. 20, the V-phase and W-phase 8 windings are also executed according the same winding principle to occupy all the phase slots and slot-positions of V1 to V8 and W1 to W8 to achieve parallel-connected windings of V and W. Y1 to Y8. The winding methods of V-phase and W-phase winding are the same as U-phase winding, so the pole pitch or full pitch of the winding is the same as 6 slots. The common span (common pitch) of the transpolar hairpin wires on the insertion side is 7 (6+1) slots. No trans-layer connection wire is used.

Figure 23:
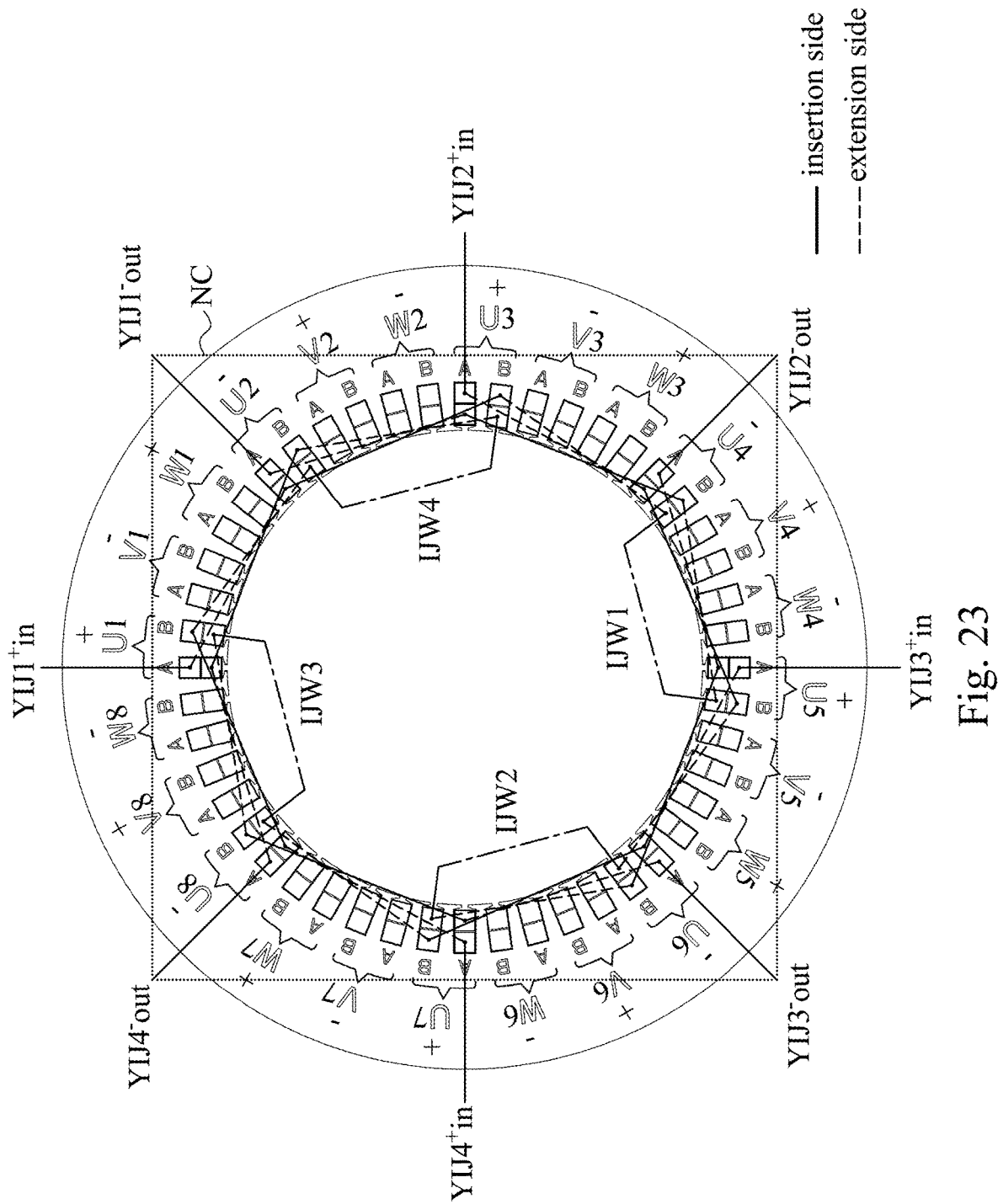
FIG. 23 illustrates 4 windings configured in U phases of a 48-slot motor stator using same-layer connection wires according to an embodiment of the present disclosure.

Reference is made to FIG. 23, which illustrates 4 windings configured in U phases of a 48-slot motor stator using same-layer connection wires according to an embodiment of the present disclosure. If the aforementioned same-layer connection wire (such as the same-layer connection wire in FIG. 9) is applied to the U-phase 8 windings in FIG. 20, the U-phase 4 winding in this embodiment can be constructed. Specifically, a same-layer connection wire IJW1 is used to connect the inner wire ends of the U-phase windings Y1 and Y2 in FIG. 20, and a same-layer connection wire IJW2 is used to connect the inner wire ends of the U-phase windings Y3 and Y4 in FIG. 20. A same-layer connection wire IJW3 is used to connect the inner wire ends of the U-phase windings Y5 and Y6 in FIG. 20, and a same-layer connection wire IJW4 is used to connect the inner wire ends of the U-phase windings Y7 and Y8 in FIG. 20 to form windings YIJ1 to YIJ4 of U phase in this embodiment. Connecting the negative ends of YIJ1 to YIJ4 (YIJN−out) to the neutral terminal NC, and connecting the positive ends of YIJ1 to YIJ4 (YIJN+in) to the phase terminals of the U phase to form a parallel-connected U-phase windings YIJ1 to YIJ4. The winding method of the parallel-connected winding YIJ1 to YIJ4 of this embodiment can also be applied to the V phase and the W phase.

Figure 24:
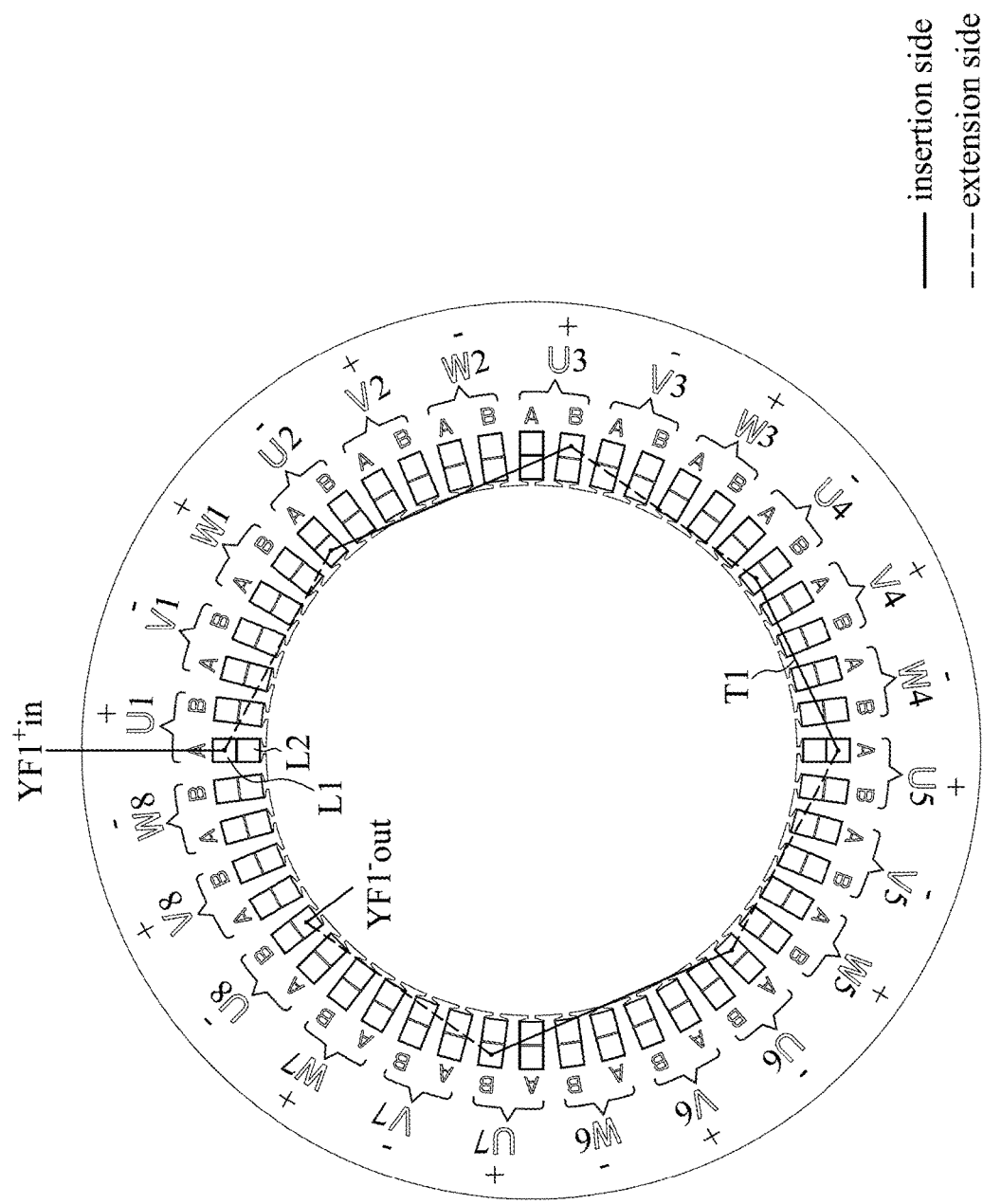
FIG. 24 illustrates one of the windings configured in U phases of a 48-slot motor stator according to another embodiment of the present disclosure.

Reference is made to FIG. 24, which illustrates one of the windings configured in U phases of a 48-slot motor stator according to another embodiment of the present disclosure. Different from the winding Y1 in FIG. 19, the winding Y1 in FIG. 19 is routed from phases U1 to U4 and repeated once to phases U5 to U8 in the winding of this embodiment. Specifically, the wire of winding YF1 is routed into the L1 layer of the phase slot A of the U1 phase on the insertion side of the stator core, and then connected to the L2 layer of the phase slot A of the U2 phase on the extension side of the stator core, then connected to the L1 layer of phase slot B of phase U3 on the insertion side of the stator core, then connected to the L2 layer of phase slot B of phase U4 on the extension side of the stator core, and connected to the L1 layer of phase slot A of U5 phase by a trans-layer connection wire T1, and then connected to the L2 layer of phase slot A of U6 phase on the extension side of the stator core, and then connected to the L1 layer of the phase slot B of the U7 phase on the insertion side of the stator core, and then connected to the L2 layer of the phase slot B of the U8 phase on the extension side of the stator core. At this point, the wire of winding YF1 has passed through phase slots A and B of the L1 layer twice, and also passed through the phase slots A and B of the L2 layer twice, the sequence is form A to B, and routed out at this point. Winding YF1 in FIG. 24 and Winding Y1 in FIG. 19 have the same winding method except for the trans-layer connection wire, so the pole pitch or full pitch of the winding is the same as 6 slots. The common span (common pitch) of transpolar hairpin wires on the insertion side is still 7 (6+1) slots. In addition to transpolar hairpin wires, the span of the trans-layer connection wire T1 on the insertion side is 5 slots, and the span of the trans-layer connection wire can be obtained from the common span 7 slots minus the number (Q=2) of phase slots for each phase.

Figure 25:
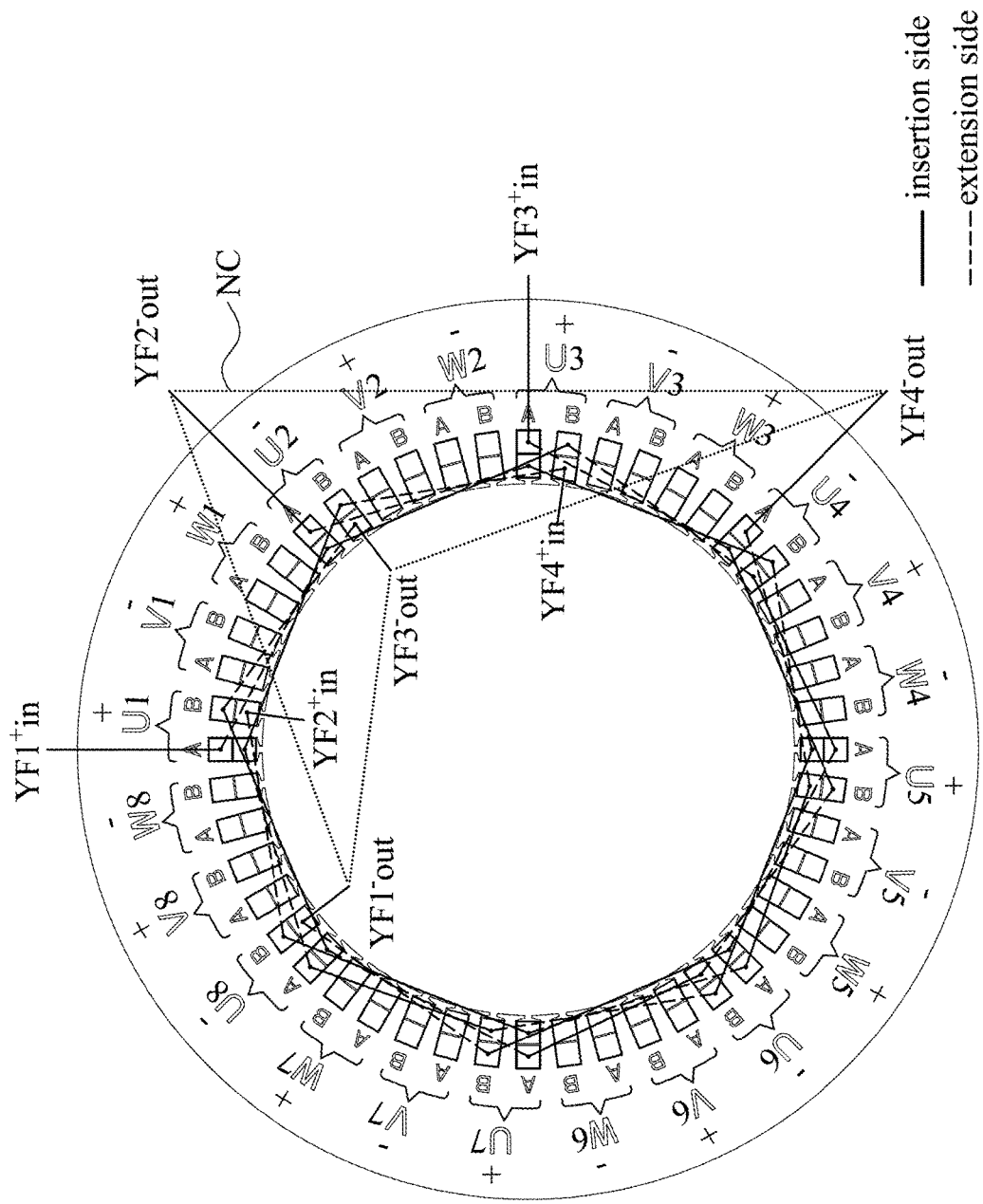
FIG. 25 illustrates 4 windings configured in U phases of a 48-slot motor stator according to another embodiment of the present disclosure.

Reference is made to FIG. 25, which illustrates 4 windings configured in U phases of a 48-slot motor stator according to another embodiment of the present disclosure. Continuing from the winding YF1 in FIG. 24, the wire of winding YF2 follows the same winding rules as the winding YF1. Specifically, the wire of the winding YF2 is routed into the L1 layer of phase slot A of phase U2 on the insertion side of the stator core, and circulated clockwise in phases U2 to U5, and passed through the phase slots A and B of the L1 to L2 layer once. After the trans-layer connection wire, the wire of the winding YF2 is circulated clockwise through the phase slots A and B of the L1 to L2 layer in the U6 to U1 phases, and routed out from the L2 layer of phase slot B of the phase U1. Based upon the same winding method, the winding YF3 is routed into the L1 layer of the phase slot A of the U3 phase on the insertion side of the stator core, and routed out from the L2 layer of the phase slot B of the U2 phase. The winding YF4 is routed into the L1 layer of the phase slot A of the phase U4 on the insertion side of the stator core, and routed out from the L2 layer of the phase slot B of the phase U3. The wires of U-phase windings YF1 to YF4 occupy all phase slots and slot-positions of U1 to U8. Connecting the negative ends (YFN−out) of YF1 to YF4 to the neutral terminal NC, and connecting the positive ends (YFN+in) of YF1 to YF4 to the phase terminals of the U phases to form a parallel-connected U-phase winding YF1 to YF4. In other embodiments, the winding rule changes in FIGS. 14 and 16 can also be applied to the winding of the 48-slot motor stator. The winding methods of winding YF1 to YF4 in FIG. 25 are the same as those of winding YF1 in FIG. 24, so the pole pitch or full pitch of the winding is the same as 6 slots. The common span (common pitch) of transpolar hairpin wires on the insertion side is still 7 (6+1) slots. The span of the trans-layer connection wire on the insertion side is the same as 5 slots.

Figure 26:
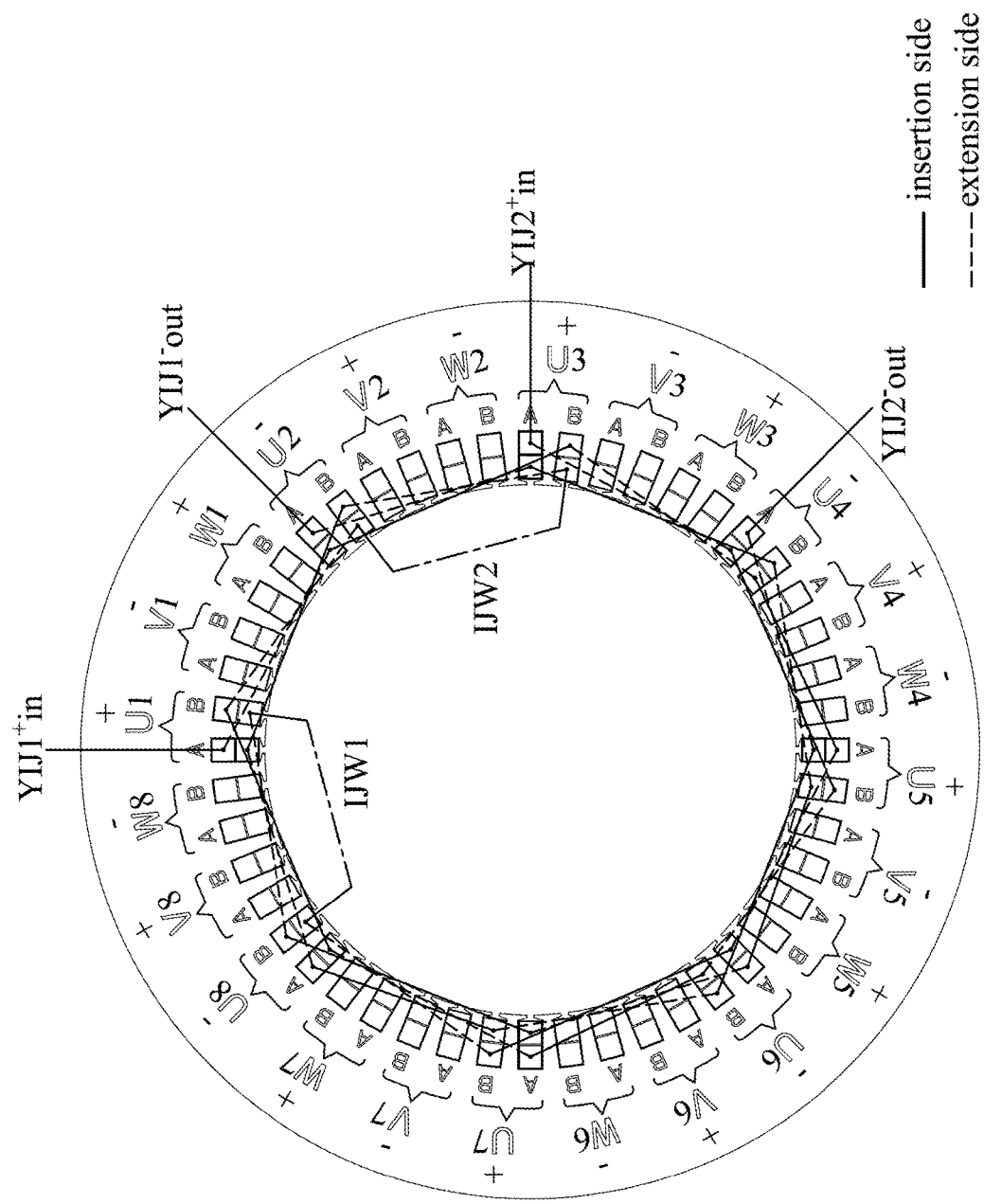
FIG. 26 illustrates 2 windings configured in U phases of a 48-slot motor stator using same-layer connection wires according to another embodiment of the present disclosure.

Reference is made to FIG. 26, which illustrates 2 windings configured in U phases of a 48-slot motor stator using same-layer connection wires according to another embodiment of the present disclosure. If the aforementioned same-layer connection wire (such as the same-layer connection wire in FIG. 23) is applied to the U-phase 4 windings in FIG. 25, the U-phase 2 windings in this embodiment can be constructed. Specifically, a same-layer connection wire IJW1 is used to connect the inner wire ends of the U-phase windings YF1 and YF2 in FIG. 25, and a same-layer connection wire IJW2 is used to connect the inner wire ends of the U-phase windings YF3 and YF4 in FIG. 25 to form the U-phase windings YIJ1 and YIJ2 in this embodiment. Connecting the negative ends (YIJN−out) of YIJ1 and YIJ2 to the neutral terminal(s), and connecting the positive end (YIJN+in) of YIJ1 and YIJ2 to the phase terminal(s) of the U phase to form the U-phase parallel-connected windings YIJ1 and YIJ2. The winding method of the parallel-connected winding YIJ1 and YIJ2 in this embodiment can also be applied to the V phase and the W phase.

In the previous embodiments, 72 slots and 48 slots are used as examples of the hairpin wire stator, but the specific number of slots of the stator is not limited. Each of the U-phase, V-phase, and W-phase has 2 or 3 phase slots, but more than 2 phase slots can meet the requirements of the above-mentioned winding method.

The hairpin wire stator disclosed herein utilizes the above-mentioned winding method to make a single winding routed through the multiple phase slots (such as A, B or A, B, C) within adjacent slot-position layers (such as L1 to L2) in the U, V, and W phases with winding through each slot-position by the same number of times, such that all the windings are evenly arranged in each slot-position to avoid the generation of circulating current. In addition, at least one of the winding methods can also make the number of parallel-connected windings of each phase equal to the number of polar regions at most. At least one of the embodiments can reduce the wire types of the hairpin wires, and only need transpolar hairpin wires (common pitch wire) and trans-layer connection wire.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hairpin wire motor stator comprising:
a ring-shaped stator core defining a rotor accommodation space at a center of the stator core, wherein the stator core comprises an insertion side and an extension side allowing a plurality of hairpin wires to be inserted from the insertion side and protruded out from the extension side;
a plurality of slot-positions disposed on the stator core and surrounding the rotor accommodation space circumferentially, the slot-positions forming a plurality of radially-adjacent slot-position layers, the stator core comprising a plurality of polar regions, each polar region comprising a plurality of phases, each phase comprising a plurality of phase slots, the phase slots being disposed circumferentially adjacent and comprising at least a leftmost phase slot and a rightmost phase slot, each phase slot comprising the slot-positions that are radially-adjacent;
the hairpin wires configured to be disposed into the slot-positions of the phase slots of the same phases of the polar regions, the hairpin wires being connected to form a plurality of windings,
wherein the hairpin wires comprise a plurality of transpolar hairpin wires that are routed through immediately-adjacent two of the slot-position layers, all the transpolar hairpin wires that are routed the same through immediately-radially-adjacent two of the slot-position layers have a same span at the insertion side, a quotient is obtained by dividing a total number of the phase slots by a total number of the polar regions, and the span equals to the quotient plus or minus 1; and
at least a trans-layer connection wire connected between two of the windings that are routed through different immediately-radially-adjacent two of the slot-position layers, each winding comprises all the transpolar hairpin wires that are routed through the same immediately-radially-adjacent two of the slot-position layers, and each winding has two ends disposed into the leftmost phase slot and the rightmost phase slot of the phase slots of the same phases across the polar regions, wherein the trans-layer connection wire has two ends disposed into the leftmost phase slot and the rightmost phase slot of the phase slots of the same phases across the polar regions.

2. The hairpin wire motor stator of claim 1, wherein each transpolar hairpin wire has a first leg and a second leg, the first leg and the second leg are disposed across immediately-adjacent two of the slot-position layers and into a first phase slot and a second phase slot of the same phases across the polar regions respectively, wherein the second phase slot is immediately-adjacent to a third phase slot that is spaced from the first phase slot by a pole pitch.

3. The hairpin wire motor stator of claim 1, wherein one of two ends of one of the windings protrudes out of the insertion side or the extension side to be connected to a phase terminal or a neutral terminal.

4. The hairpin wire motor stator of claim 1, wherein the trans-layer connection wire has two ends spaced by a pole pitch.

5. The hairpin wire motor stator of claim 1, further comprising a same-layer connection wire connected between two of the windings, wherein the same-layer connection wire has two ends disposed at a same one of the slot-position layers and spaced by a pole pitch.

6. The hairpin wire motor stator of claim 5, wherein the same-layer connection wire has two ends disposed at a radially-outmost one or a radially-innermost one of the slot-position layers.

7. The hairpin wire motor stator of claim 1, wherein the hairpin wires have all legs, protruded from the extension side and disposed within immediately-adjacent two of the slot-position layers, connected to form the span of a pole pitch.

8. A hairpin wire motor stator comprising:
a ring-shaped stator core defining a rotor accommodation space at a center of the stator core, wherein the stator core comprises an insertion side and an extension side allowing a plurality of hairpin wires to be inserted from the insertion side and protruded out from the extension side;
a plurality of slot-positions disposed on the stator core and surrounding the rotor accommodation space circumferentially, the slot-positions forming a plurality of radially-adjacent slot-position layers, the stator core comprising a plurality of polar regions, each polar region comprising a plurality of phases, each phase comprising a plurality of phase slots, the phase slots being disposed circumferentially adjacent and comprising at least a leftmost phase slot and a rightmost phase slot, each phase slot comprising the slot-positions that are radially-adjacent;
the hairpin wires configured to be disposed into the slot-positions of the phase slots of the same phases of the polar regions, the hairpin wires being connected to form a plurality of windings, each winding is routed through immediately-adjacent two of the slot-position layers at the insertion side and the extension side, and configured to be:
at the extension side, routed through the same phases of all the polar regions by a span of a pole pitch;
at the insertion side, routed through a first phase slot and a second phase slot of the same phases of all the polar regions, wherein the second phase slot is immediately-adjacent to a third phase slot that is spaced from the first phase slot by a pole pitch,
wherein the hairpin wires comprise a plurality of transpolar hairpin wires, all hairpin wires that are routed through the same the transpolar immediately-radiallyadjacent two of the slot-position layers have a same span at the insertion side; and at least a trans-layer connection wire connected between two of the windings that are routed through different immediately-radially-adjacent two of the slot-position layers, each winding comprises all the transpolar hairpin wires that are routed through the same immediately-radially-adjacent two of the slot-position layers, and each winding has two ends disposed into the leftmost phase slot and the rightmost phase slot of the phase slots of the same phases across the polar regions, wherein the trans-layer connection wire has two ends disposed into the leftmost phase slot and the rightmost phase slot of the phase slots of the same phases across the polar regions.

9. The hairpin wire motor stator of claim 8, wherein one end of one of the windings is disposed at a radially-outmost one or a radially-innermost one of the slot-position layers to be connected to a phase terminal or a neutral terminal.

10. The hairpin wire motor stator of claim 8, wherein a quotient is obtained by dividing a total number of the phase slots by a total number of the polar regions, and the span equals to the quotient plus or minus 1.

11. The hairpin wire motor stator of claim 8, further comprising at least a same-layer connection wire connected between two of the windings, wherein the same-layer connection wire has two ends disposed at a same one of the slot-position layers and spaced by a pole pitch.

12. The hairpin wire motor stator of claim 8, wherein the hairpin wires protrude out from the insertion side to form:
a number YN of ends to be connected to phase terminals; and
a number YN of ends to be connected to neutral terminals, wherein YN is a total number of the polar regions.

13. A hairpin wire motor stator comprising:
a ring-shaped stator core comprising a first side and an opposite second side, wherein the first side is an insertion side of the stator core;
a plurality of slot-positions disposed on the stator core allowing a plurality of hairpin wires to be configured through, the slot-positions disposed on the stator core in a circumferential direction to form adjacent slots and a plurality of radially-adjacent slot-position layers, the stator core comprising a plurality of polar regions, each polar region comprising a group of the slot-positions, each polar region comprising a plurality of phases, each phase comprising a plurality of phase slots, the phase slots being disposed circumferentially adjacent and comprising at least a leftmost phase slot and a rightmost phase slot;

a plurality of windings, each winding composed of the hairpin wires connected and disposed across the polar regions, wherein all the connected hairpin wires are disposed across immediately-adjacent two of the slot-position layers, and have a span, in the circumferential direction at the first side, equal to:
a pole pitch plus an adjacent slot; or
a pole pitch minus an adjacent slot; or
a combination of a pole pitch plus an adjacent slot and a pole pitch minus an adjacent slot,
wherein the hairpin wires comprise a plurality of transpolar hairpin wires, all the transpolar hairpin wires that are routed through the same immediately-radially-adjacent two of the slot-position layers have a same span at the insertion side; and at least a trans-layer connection wire connected between two of the windings that are routed through different immediately-radially-adjacent two of the slot-position layers, each winding comprises all the transpolar hairpin wires that are routed through the same immediately-radially-adjacent two of the slot-position layers, and each winding has two ends disposed into the leftmost phase slot and the rightmost phase slot of the phase slots of the same phases across the polar regions, wherein the trans-layer connection wire has two ends disposed into the leftmost phase slot and the rightmost phase slot of the phase slots of the same phases across the polar regions.

14. The hairpin wire motor stator of claim 13, wherein one end of one of the windings is disposed at a radially-outmost one or a radially-innermost one of the slot-position layers to be connected to a phase terminal or a neutral terminal.

15. The hairpin wire motor stator of claim 13, further comprising at least a same-layer connection wire connected between two of the windings, wherein the same-layer connection wire has two ends disposed at a same one of the slot-position layers, and the two ends are spaced by a pole pitch.

* * * * *